(12) United States Patent
Fenger

(10) Patent No.: US 12,116,249 B2
(45) Date of Patent: Oct. 15, 2024

(54) SELF-HOISTING CRANE SYSTEM AND METHOD OF HOISTING A SELF-HOISTING CRANE

(71) Applicant: LIFTRA IP APS, Aalborg SV (DK)

(72) Inventor: Per Eske Fenger, Terndrup (DK)

(73) Assignee: Liftra IP APS, Aalborg SV (DK)

( * ) Notice: Subject to any disclaimer, the term of this patent is extended or adjusted under 35 U.S.C. 154(b) by 416 days.

(21) Appl. No.: 17/608,022

(22) PCT Filed: Apr. 28, 2020

(86) PCT No.: PCT/EP2020/061691
§ 371 (c)(1),
(2) Date: Nov. 1, 2021

(87) PCT Pub. No.: WO2020/221716
PCT Pub. Date: Nov. 5, 2020

(65) Prior Publication Data
US 2022/0281722 A1 Sep. 8, 2022

(30) Foreign Application Priority Data

May 2, 2019 (DK) .............................. PA201970284

(51) Int. Cl.
*B66C 23/34* (2006.01)
*B66C 23/20* (2006.01)

(52) U.S. Cl.
CPC ............ *B66C 23/34* (2013.01); *B66C 23/207* (2013.01)

(58) Field of Classification Search
CPC .................. B66C 23/207; B66C 23/32; B66C 23/185–206; B66C 23/208–305;
(Continued)

(56) References Cited

U.S. PATENT DOCUMENTS 9,651,021 B2 * 5/2017 Neumann ................ B66D 1/60
10,703,610 B2    7/2020 Fenger
(Continued)

FOREIGN PATENT DOCUMENTS

CN    101541660 A    9/2009
CN    103161688 A    6/2013
(Continued)

OTHER PUBLICATIONS

Liftra Self Hoisting Crane Youtube Video dated Oct. 16, 2016 https://www.youtube.com/watch?v=gCBrQYMvwY4, Retrieved Feb. 15, 2024 (Year: 2016).*
(Continued)

*Primary Examiner* — Sang K Kim
*Assistant Examiner* — Nathaniel L Adams
(74) *Attorney, Agent, or Firm* — Birch, Stewart, Kolasch & Birch, LLP

(57) ABSTRACT

The self-hoisting crane is adapted to be hoisted from a container to a nacelle by operating a cable winch in the container, at least one cable is adapted to extend from the cable winch, around an exit sheave arranged in the container, and exit the container from the exit sheave in an upward direction in order to pass around at least one roller arranged at a crane base on the nacelle and continue in a downward direction to the crane, enter through a central opening in the crane pedestal and continue to the hook block. The exit sheave is located at a longitudinal position of the container deviating not more than 10 percent of the length of the container from the longitudinal position of the centre of gravity of the container.

20 Claims, 27 Drawing Sheets

(58) Field of Classification Search
CPC . B66C 23/34–348; B66C 23/82; F03D 13/10; F05B 2230/61
See application file for complete search history.

(56) References Cited

U.S. PATENT DOCUMENTS

| | | | |
|---|---|---|---|
| 11,454,217 B2* | 9/2022 | Svinth | ............ F03D 13/10 |
| 2007/0290426 A1 | 12/2007 | Trede et al. | |
| 2008/0216301 A1 | 9/2008 | Hansen et al. | |
| 2010/0028152 A1 | 2/2010 | Numajiri et al. | |
| 2011/0042632 A1 | 2/2011 | Van Berlo et al. | |
| 2012/0217089 A1* | 8/2012 | Fenger | ............ F03D 80/50 182/2.1 |
| 2013/0156560 A1 | 6/2013 | Moestrup et al. | |
| 2014/0010658 A1* | 1/2014 | Nielsen | ............ F03D 80/50 29/889.1 |
| 2021/0206606 A1* | 7/2021 | Aitken | ............ B66C 23/207 |
| 2022/0055869 A1* | 2/2022 | Kastrup | ............ B66C 23/185 |

FOREIGN PATENT DOCUMENTS

| | | | | |
|---|---|---|---|---|
| CN | 106586846 A | | 4/2017 | |
| CN | 108473287 A | | 8/2018 | |
| DE | 102011002108 A1 | | 10/2012 | |
| EP | 1239150 A2 | * | 9/2002 | ............ F03D 1/003 |
| GB | 354235 A | | 8/1931 | |
| JP | 2003-293938 A | | 10/2003 | |
| JP | 2009-2206 A | | 1/2009 | |
| NL | 1035301 C1 | | 6/2008 | |
| WO | WO 2006/053554 A2 | | 5/2006 | |
| WO | WO 2011/050812 A1 | | 5/2011 | |
| WO | WO-2020035119 A1 | * | 2/2020 | ............ B66C 23/207 |

OTHER PUBLICATIONS

A self-hoisting crane as comprised in: https://www.youtube.com/watch?v=gCBrQYMvwY4&feature=emb_logo, published on Oct. 26, 2016.

* cited by examiner

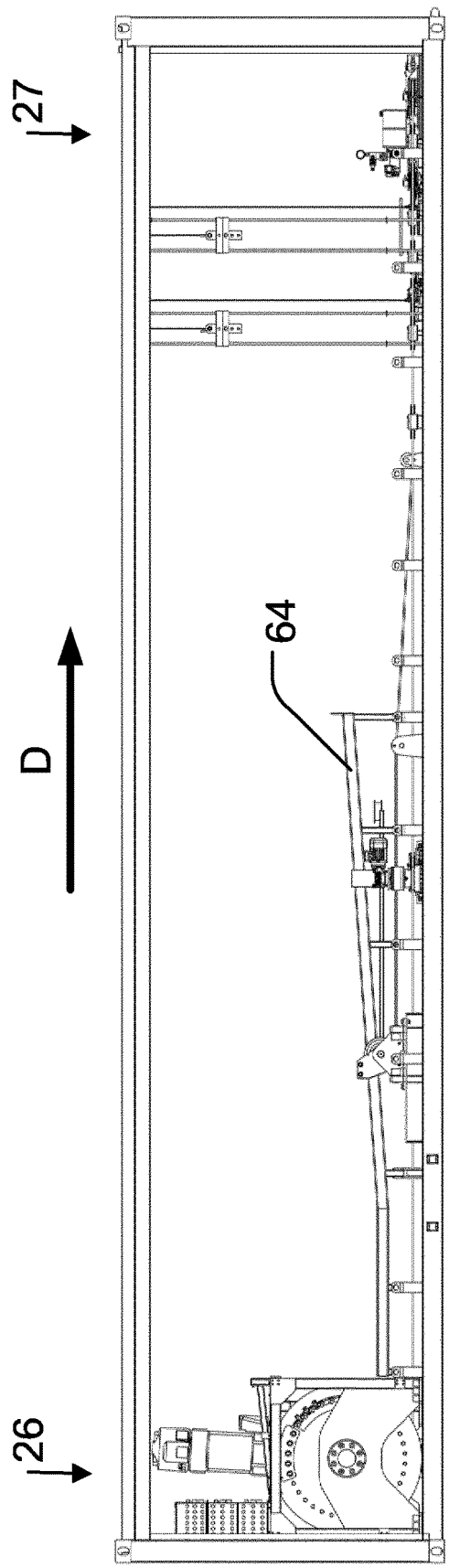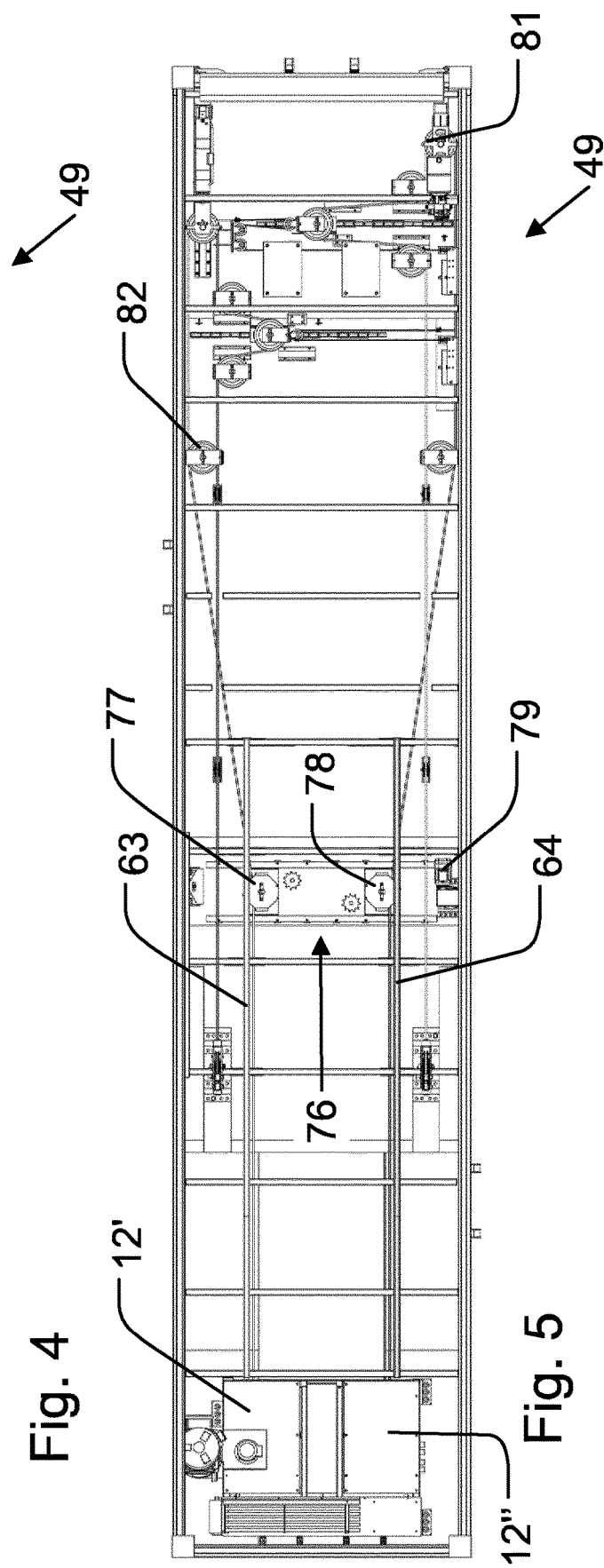

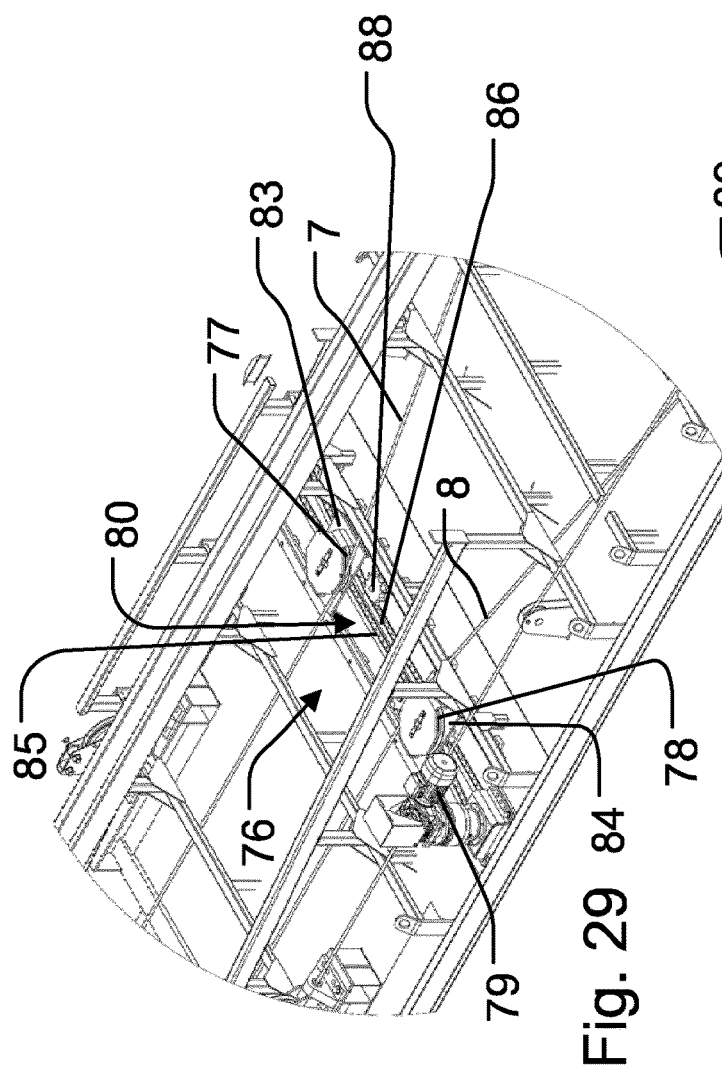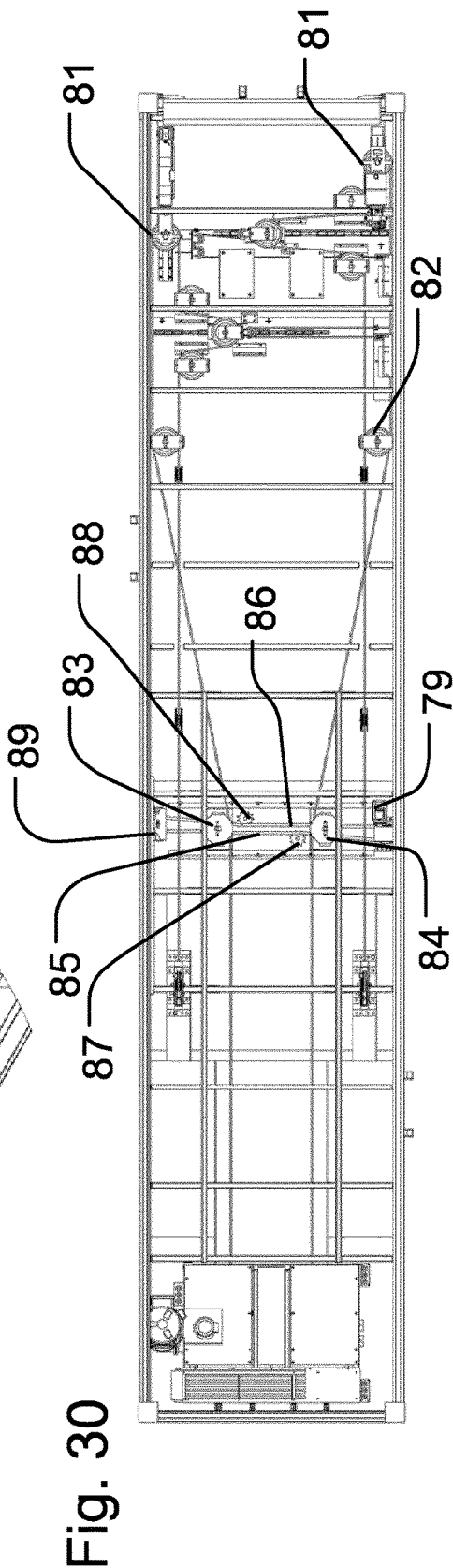

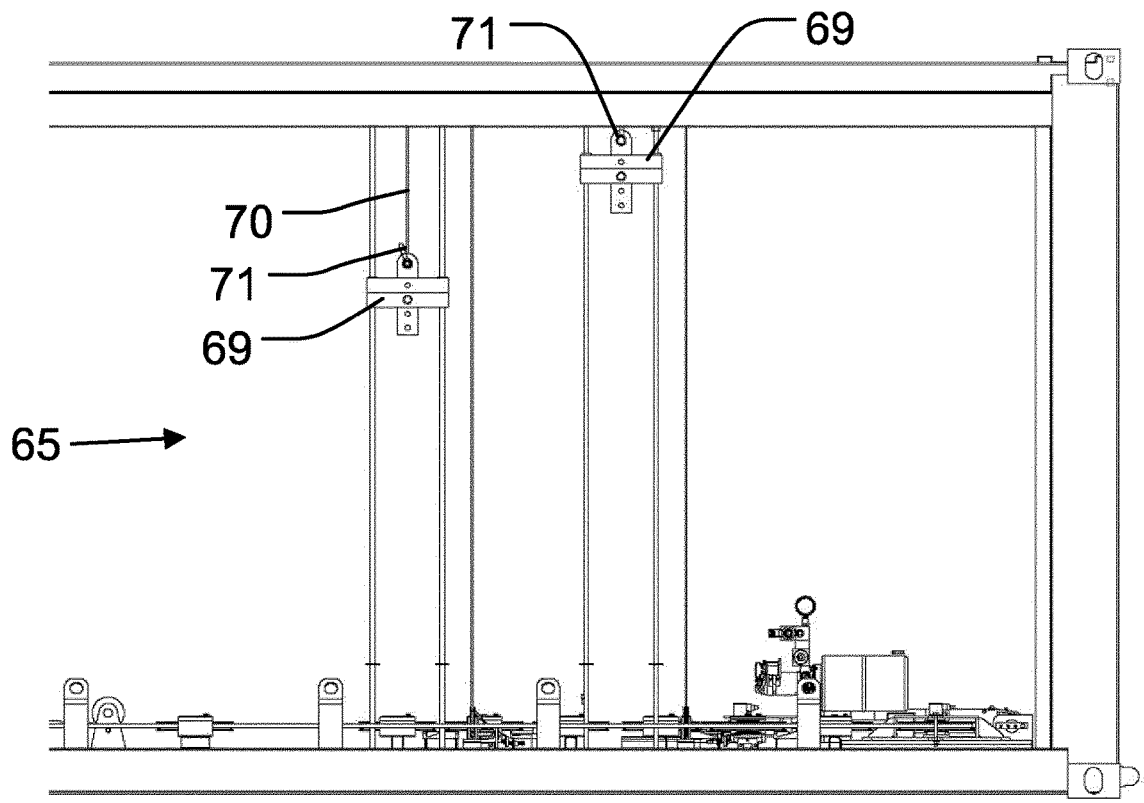
Fig. 33
Fig. 34
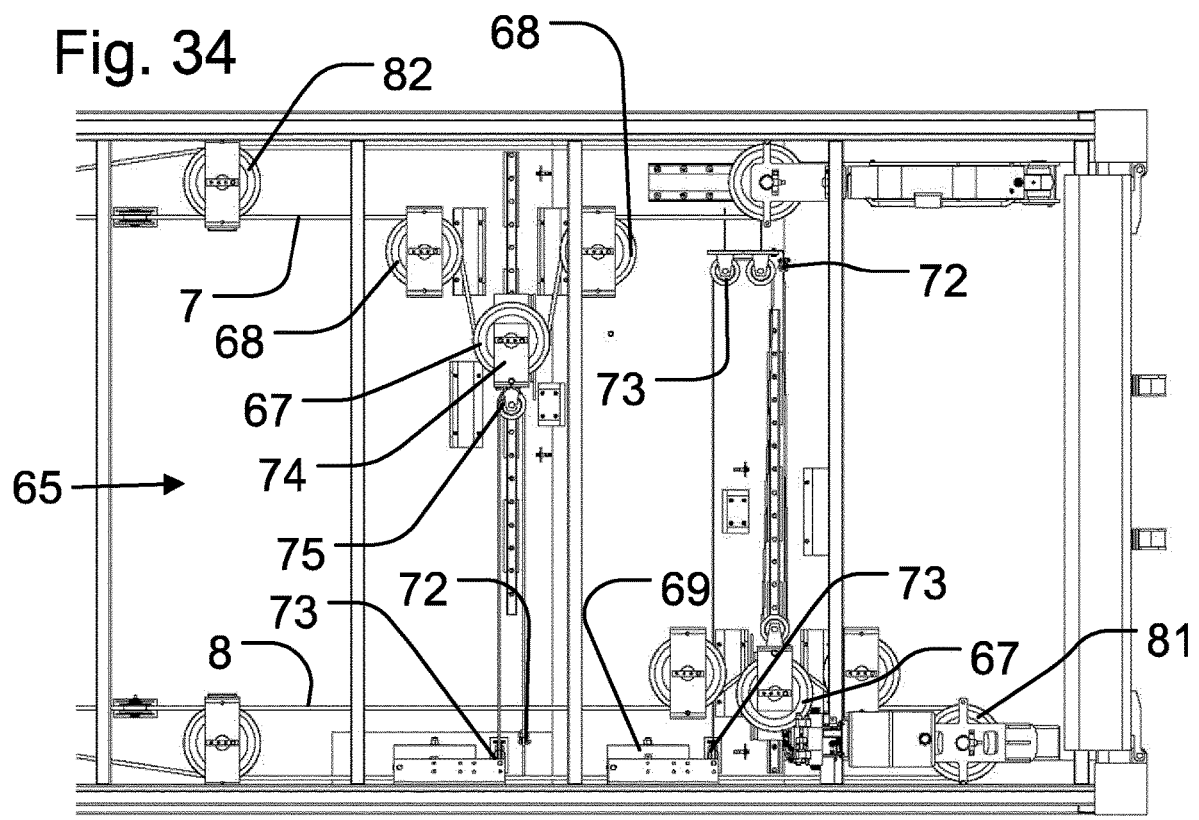

SELF-HOISTING CRANE SYSTEM AND METHOD OF HOISTING A SELF-HOISTING CRANE

The present invention relates to a self-hoisting crane system including a self-hoisting crane and a container for transporting, lifting and lowering the self-hoisting crane to and from a wind turbine, wherein the container has a longitudinal direction extending from a first to a second end of the container, wherein the container includes a cable winch arranged in the first end of the container, wherein the self-hoisting crane is adapted to be hoisted from the container to the nacelle by operating the cable winch in the container, wherein at least one cable is adapted to extend from the cable winch in the container, around an exit sheave arranged in the container, and exit the container from the exit sheave in an upward direction in order to pass around at least one roller arranged at a crane base arranged on the nacelle and continue in a downward direction to the self-hoisting crane, enter through a central opening in a pedestal of the self-hoisting crane and continue to a hook block of the self-hoisting crane, wherein the container includes a guide system adapted to guide the self-hoisting crane during part of the lifting and lowering of the self-hoisting crane from and to the container, and wherein the container including cable winch, guide system, exit sheave and any auxiliary hoisting equipment located in the container, but excluding the self-hoisting crane, has a centre of gravity located at a longitudinal position between the first and second ends on the container.

WO 2011/050812 A1 (Liftra ApS) discloses a self-hoisting crane adapted to be mounted on a crane base mounted on the nacelle of a wind turbine. The self-hoisting crane is lifted to the nacelle upside down by means of a winch placed on ground which pulls two wires extending upwards from the winch to the nacelle and thereby guiding the crane in that the crane is provided with rollers rolling on the wires. On the crane base, each wire passes a number of rollers and extends downwards to the self-hoisting crane in which the wires are attaches to a hook block of the crane. When the crane arrives at the nacelle of the wind turbine, the crane is mounted on the crane base. In its mounted position on the nacelle, the crane may be used for lifting heavy parts by means of the same wires that were used for lifting the crane itself, and by operating the winch on ground. The self-hoisting crane may be used for servicing and replacement of the heaviest parts located in the wind turbine nacelle. The advantage of this type of crane is that it eliminates the need for large mobile cranes at servicing of wind turbines, and thereby substantial savings may be achieved when performing these tasks.

In a known further development of the above described self-hoisting crane, the self-hoisting crane is transported to and from the location of a wind turbine in a container, and the self-hoisting crane is lifted from the container by means of a winch arranged in an end of the container. In this way, the tip end of the self-hoisting crane leaves the container from the end of the container being opposed to the winch. However, depending on the inclination of the ground surface next to the wind turbine and the distance between the container and the wind turbine tower, among other things, the load of the cable hoisting the crane may cause the container to lift slightly from the ground at the end of the container where the self-hoisting crane leaves the container so that the container is not providing a stable ballast for the self-hoisting crane during its hoisting to the nacelle.

The object of the present invention is to provide a self-hoisting crane system being better stabilised during hoisting.

In view of this object, the exit sheave is located at a longitudinal position of the container deviating not more than 10 percent of the length of the container from the longitudinal position of the centre of gravity of the container.

In this way, by locating the at least one exit sheave near the centre of gravity of the container, substantially the whole weight of the container may provide ballast for the hoisting of the self-hoisting crane, whereby the at least one cable may be tensioned by a substantially higher force than according to the known solution. Thereby, the self-hoisting crane may be better stabilised during hoisting of the crane to the nacelle of the wind turbine.

In an embodiment, the self-hoisting crane includes an arm base and a boom arm, the hook block is arranged at a tip end of the boom arm, the at least one cable is adapted to lift or lower the hook block for operation of the self-hoisting crane in its mounted position on the nacelle, and the pedestal is adapted to be mounted on the crane base.

In an embodiment, the arm base is provided with at least one base roller, the tip end of the boom arm is provided with at least one boom arm roller, and the self-hoisting crane is adapted to be lifted from the container with the pedestal pointing upwards until it reaches the crane base in that the at least one base roller and the at least one boom arm roller roll on the at least one cable.

In an embodiment, the exit sheave is arranged rotationally in a sheave housing about an axis of rotation being at least substantially at right angles to the longitudinal direction of the container, and the sheave housing is arranged pivotally in relation to the container about a pivot axis extending at least substantially in the longitudinal direction of the container. Thereby, the exit sheave may better confirm to the angle of the at least one cable extending from the container to the crane base at the nacelle and thereby it may be ensured that the cable is better guided by the exit sheave. This may be advantageous, because the rolling angle of the container, which is defined as the rotation about the longitudinal axis of the container in relation to the horizontal, may vary as a result of the surface of the ground at the particular location next to the wind turbine.

In an embodiment, the sheave housing is provided with a cable guide being arranged rotationally in the sheave housing about the axis of rotation of the exit sheave. Thereby, it may be ensured that the cable follows and is maintained in contact with the groove of the exit sheave at varying angles between the cable and a floor of the container.

In an embodiment, the cable guide has the form of a first and a second plate arranged on respective sides of the exit sheave, the first and second plates are connected by means of a first and a second guide roller having respective axes of rotation being parallel to the axis of rotation of the exit sheave, and the cable exits from the exit sheave in the direction of the self-hoisting crane between the first and second guide rollers.

Thereby, the exit sheave may even better confirm to the angle of the at least one cable extending from the container to the crane base at the nacelle and thereby it may be ensured that the cable is better guided by the exit sheave. The exit angle of the cables from the exit sheaves varies during hoisting. Furthermore, the pitch angle of the container, which is defined as the rotation about the transverse axis of the container in relation to the horizontal, may vary as a result of the surface of the ground at the particular location next to the wind turbine.

In a structurally particularly advantageous embodiment, the sheave housing is arranged pivotally about the pivot axis in that a tubular spindle of the sheave housing is arranged pivotally in a sheave bracket mounted on a floor of the container, and the cable extends from the cable winch, possibly via one or more sheaves, to the exit sheave through the tubular spindle.

In an embodiment, the container is provided with at least one guide rail, the tip end of the boom arm of the self-hoisting crane is provided with a guide roller adapted to roll on the at least one guide rail, and the guide rail is inclined in upward direction in relation to a floor of the container in the longitudinal direction of the container. Thereby, during lifting of the self-hoisting crane out of the container, a smoother operation may be achieved by lifting the crane so that the tip end of the boom arm follows the guide rail in the upwardly inclined direction. In practice, this may be achieved by arranging the container at the wind turbine so that the guide rail is inclined upwardly in the direction towards the wind turbine. Furthermore, when subsequently lowering the self-hoisting crane into the container, it may be ensured that the tip end of the crane follows the guide rail in the desired direction. The tip end of the crane will follow the guide rail in the direction in which the guide rail is downwardly inclined. Thereby, the crane will automatically arrange itself correctly in the container and be ready to be lifted out of the container again.

Preferably, the guide rail is inclined in upward direction in relation to the floor of the container in the direction from the first to the second end of the container.

In an embodiment, the guide roller may be provided on the self-hoisting crane in the form of a wagon rolling on the guide rail and carrying the tip end of the boom arm of the self-hoisting crane. Thereby, the guide roller is not provided permanently on the self-hoisting crane, but only when guiding the tip end for leaving the container.

In an embodiment, the container is provided with a ballast system including a ballast sheave being arranged displaceably in a transverse direction of the container, the cable extends from the winch about the ballast sheave and to the crane, a ballast weight is hanging in a first end of a ballast cable and the ballast sheave is adapted to be pulled by the ballast cable, and the ballast cable extends over at least one roller attached to the container. Thereby, it may be ensured that the at least one cable is always under tension during hoisting. It may thereby automatically be prevented that the at least one cable gets stuck or tangled during unwinding of the cable from the winch. In prior art solutions, this has been avoided manually by pulling the cable during unwinding.

In a structurally particularly advantageous embodiment, the self-hoisting crane is provided with a first and a second cable, the cable winch includes a first and a second mirrored cable winches for the respective first and second cables, the first and a second cable winches are rotatably arranged about a common axis of rotation extending in a transverse direction of the container, the container is provided with a spooling system including a first spooling sheave guiding the first cable during spooling on the first winch and a second spooling sheave guiding the second cable during spooling on the second winch, the first and second spooling sheaves are arranged displaceably in the transverse direction of the container, and a common motor is arranged to displace the first and second spooling sheaves in opposite directions by means of a common transmission, such as a chain drive, a toothed belt or the like. Thereby, by means of a single motor, it may be avoided that the first or second cable starts following a wrong groove of the corresponding cable winch during winding of the cable.

In an embodiment, the arm base is arranged rotatably about an arm base axis on the pedestal, the arm base axis being vertical in the operational position of the self-hoisting crane, the boom arm is arranged pivotally about a boom arm axis on the arm base, the boom arm axis being horizontal in the operational position of the self-hoisting crane, a linear boom actuator is arranged between the arm base and the boom arm and is displaceable between a retracted position in which the boom arm is lowered in the operational position of the self-hoisting crane and an extended position in which the boom arm is lifted in the operational position of the self-hoisting crane, in the extended position of the linear boom actuator, a centre of gravity of the self-hoisting crane is below a straight line between the respective axes of the at least one base roller and of the at least one boom arm roller when the at least one base roller and the at least one boom arm roller roll on their corresponding cables and the linear boom actuator is positioned under the boom arm during hoisting of the self-hoisting crane to the nacelle of a wind turbine. Thereby, by arranging a centre of gravity of the self-hoisting crane below a straight line between the respective axes of the at least one base roller and of the at least one boom arm roller during hoisting of the self-hoisting crane to the nacelle, the crane may be lifted out of the container to the nacelle in a stable position and the hoisting procedure and subsequent mounting of the crane on the nacelle may thereby be facilitated in that additional measures for stabilising the crane during its hoisting may be dispensed with.

The present invention further relates to a method of hoisting a self-hoisting crane of a self-hoisting crane system, whereby the self-hoisting crane is transported to and from a wind turbine in a container, whereby the container has a longitudinal direction extending from a first to a second end of the container, whereby the self-hoisting crane is lifted and lowered between the container and the nacelle by operating a cable winch arranged at the first end of the container, whereby at least one cable extends from the cable winch in the container, around an exit sheave arranged in the container, exits the container from the exit sheave in an upward direction and subsequently passes around at least one roller arranged at a crane base arranged on the nacelle and continues in a downward direction to the self-hoisting crane, enters through a central opening in a pedestal of the self-hoisting crane and continues to a hook block of the self-hoisting crane, and whereby a guide system of the container guides the self-hoisting crane during part of the lifting and lowering of the self-hoisting crane from and to the container.

The method is characterised in that the at least one cable exits the container from the exit sheave so that, during lifting and lowering of the self-hoisting crane from and to the container, the tip end of the boom arm leaves and enters the container at an intermediate position between the first and the second end of the container.

In this way, substantially the whole weight of the container may provide ballast for the hoisting of the self-hoisting crane, whereby the at least one cable may be tensioned by a substantially higher force than according to the known solution. Thereby, the self-hoisting crane may be better stabilised during hoisting of the crane to the nacelle of the wind turbine.

In an embodiment, an arm base of the self-hoisting crane is provided with at least one base roller, a tip end of a boom arm of the self-hoisting crane is provided with at least one boom arm roller, and the self-hoisting crane is lifted from the container with the pedestal pointing upwards until it reaches the crane base in that the at least one base roller and the at least one boom arm roller roll on the at least one cable.

In an embodiment, the container including cable winch, guide system, exit sheave and any auxiliary hoisting equipment located in the container, but excluding the self-hoisting crane, has a centre of gravity located at a longitudinal position between the first and second ends on the container, and the at least one cable exits the container from the exit sheave at a longitudinal position of the container deviating not more than 10 percent of the length of the container from the longitudinal position of the centre of gravity of the container. Thereby, by locating the at least one exit sheave near the centre of gravity of the container, it may even better be ensured that substantially the whole weight of the container may provide ballast for the hoisting of the self-hoisting crane, whereby the at least one cable may be tensioned by a substantially higher force than according to the known solution. Thereby, the self-hoisting crane may be even better stabilised during hoisting of the crane to the nacelle of the wind turbine.

In an embodiment, during part of the lifting and lowering of the self-hoisting crane from and to the container, at least one guide roller at the tip end of the boom arm of the self-hoisting crane rolls on a guide rail of the container, and the guide rail is inclined in upward direction in relation to a floor of the container in the longitudinal direction of the container. Thereby, the above-mentioned features may be obtained.

The invention will now be explained in more detail below by means of examples of embodiments with reference to the very schematic drawing, in which FIG. 1 is a perspective view of the container of the self-hoisting crane system according to the invention;

FIG. 4 is a side view of the container of FIG. 3;

FIG. 5 is a top view of the container of FIG. 3;

FIG. 29 is a perspective view of a spooling system of the self-hoisting crane system according to the invention, seen in a first position of the spooling system;

FIG. 30 is a top view of the container as seen in FIG. 5, however wherein the spooling system is positioned as seen in FIG. 29;

FIG. 33 is a side view of a ballast system of the self-hoisting crane system according to the invention, seen from the side of the container; and FIG. 34 is a top view of the ballast system of FIG. 33.

Figure 13:
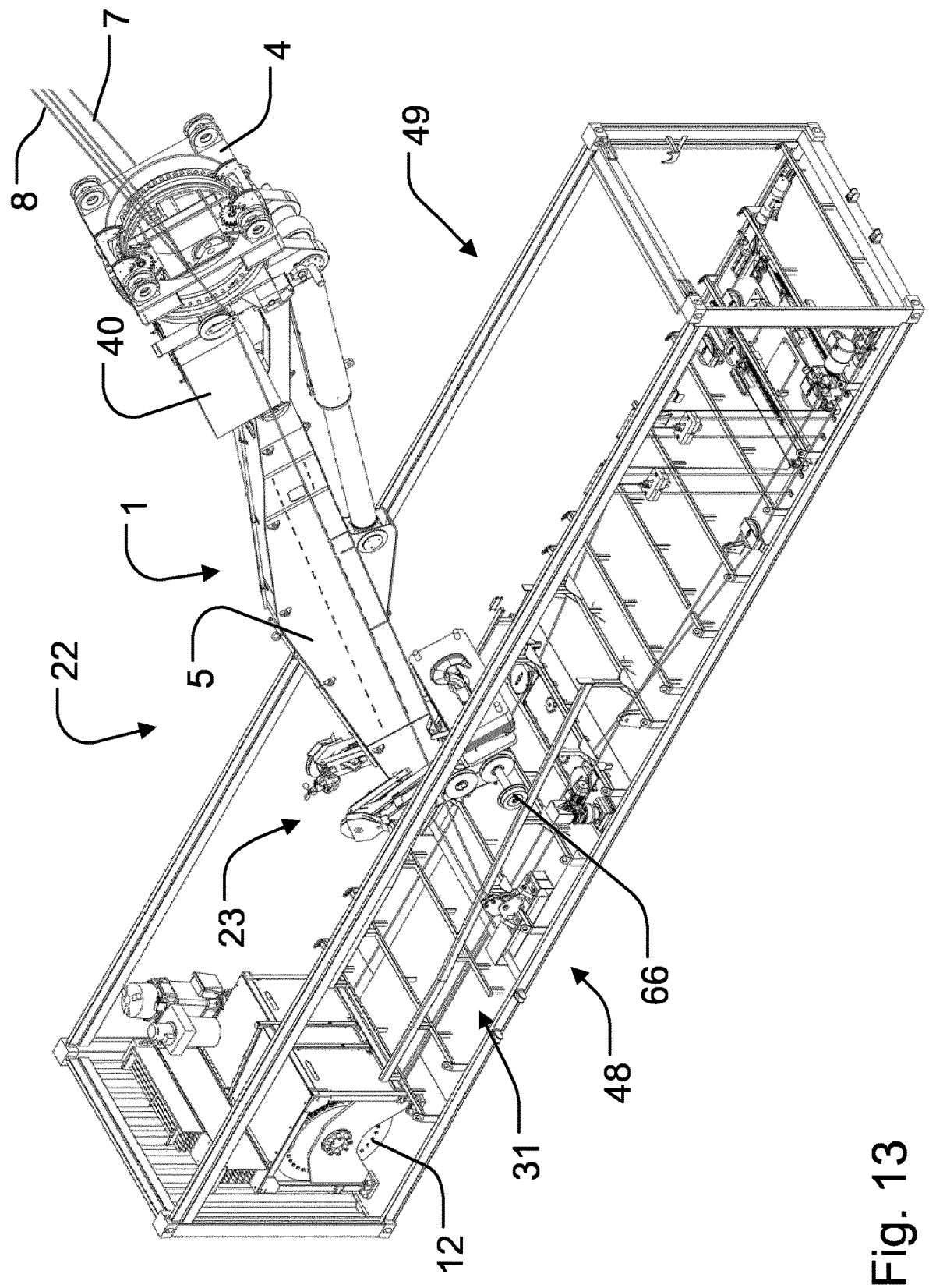
FIG. 13 is a perspective view of the container and self-hoisting crane of FIG. 12.
Figure 14:
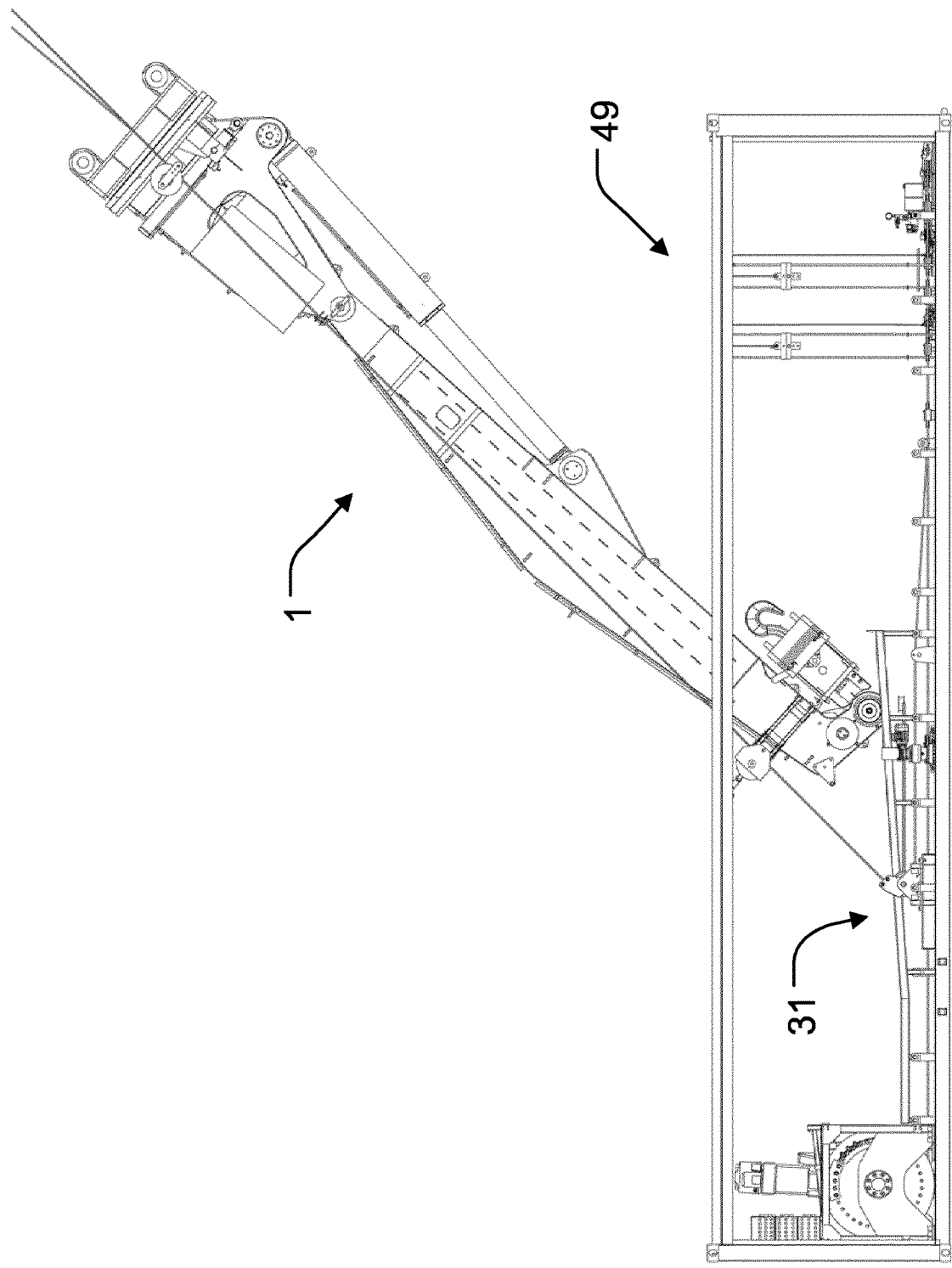
FIG. 14 is a side view of the container corresponding to that of FIG. 12, whereby the pedestal end of the self-hoisting crane has been lifted even further up from the container.
Figure 15:
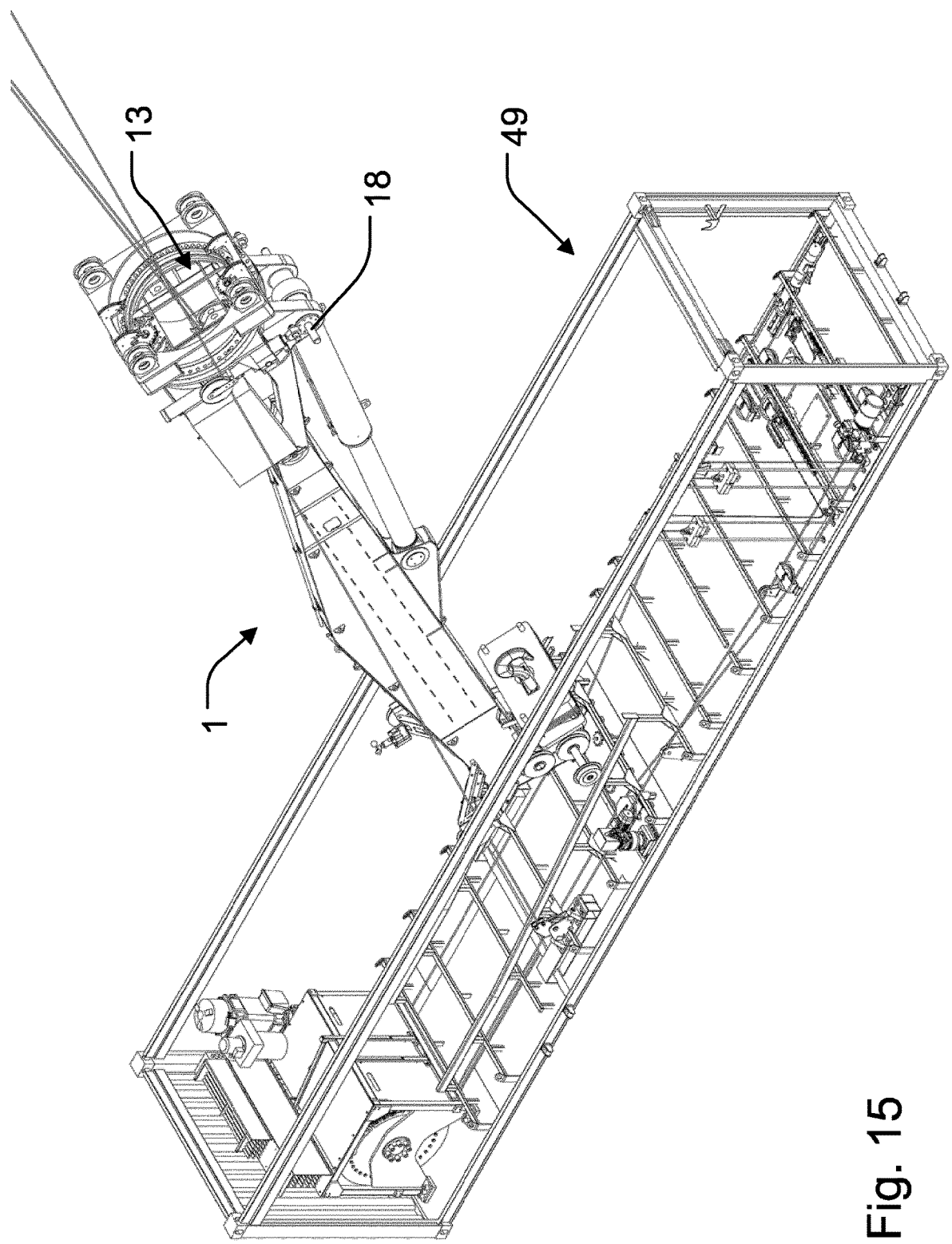
FIG. 15 is a perspective view of the container and self-hoisting crane of FIG. 14.
Figure 18:
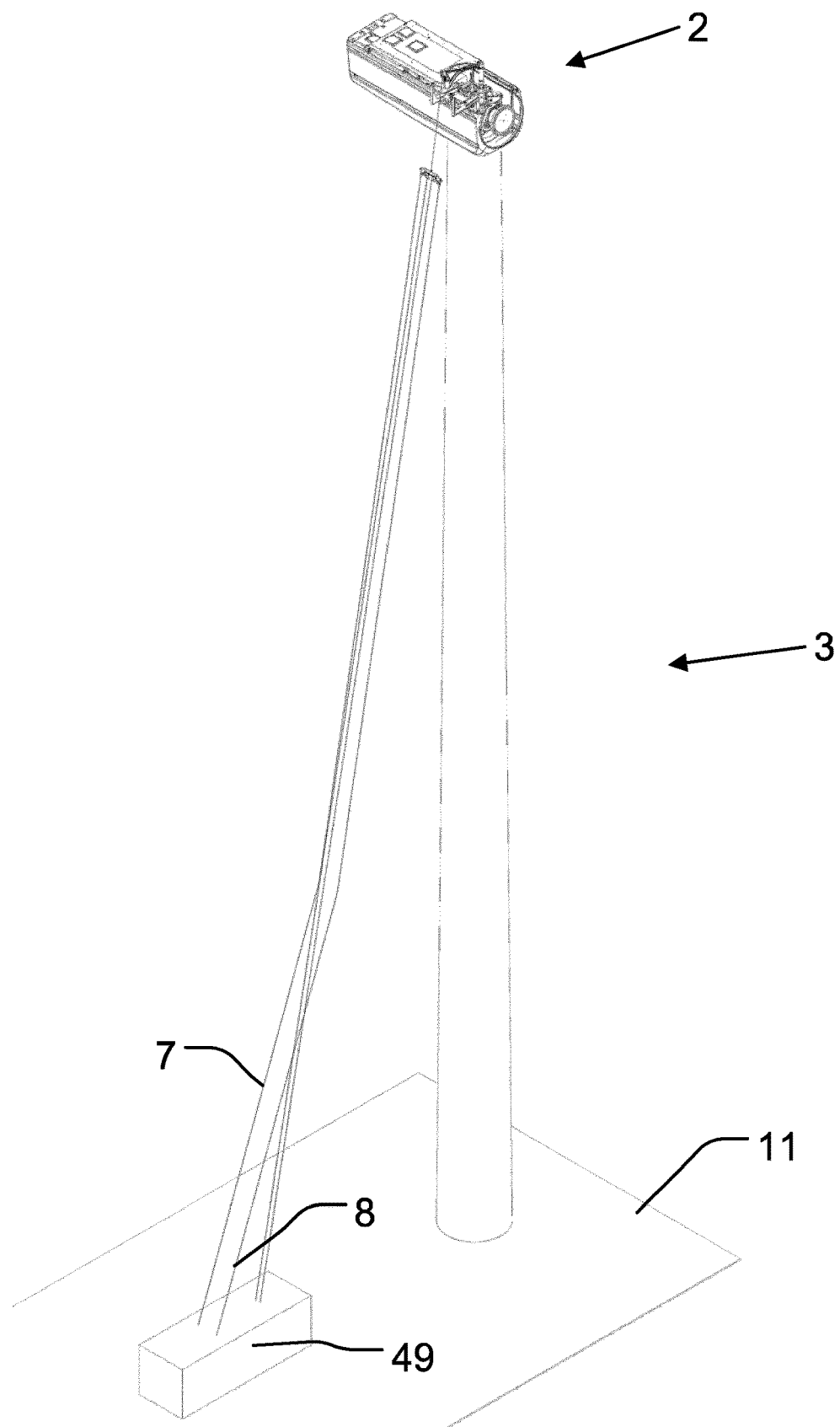
FIG. 18 is a perspective view of a wind turbine without rotor blades during lifting of a hoisting block to the nacelle by means of an auxiliary crane arranged on the nacelle.

FIG. 13 shows a self-hoisting crane system 22 including a self-hoisting crane 1 and a container 49 for transporting, lifting and lowering the self-hoisting crane 1 to and from a wind turbine 3 as illustrated in FIG. 18. As indicated in FIG. 4, the container 49 has a longitudinal direction D extending from a first end 26 to a second end 27 of the container, and the container 49 includes a cable winch 12 arranged in the first end 26 of the container. The container 49 is so dimensioned that the self-hoisting crane 1 may be transported in the container extending in the direction from the first to the second end of the container. In an embodiment, suitably, the container 49 may be a 40 feet container. The container may be positioned directly on the ground, on a truck or on a ship or platform. The container 49 may be provided with a not shown retractable or removable top or ceiling in order to allow the self-hoisting crane 1 to leave the container through its top.

Figure 16:
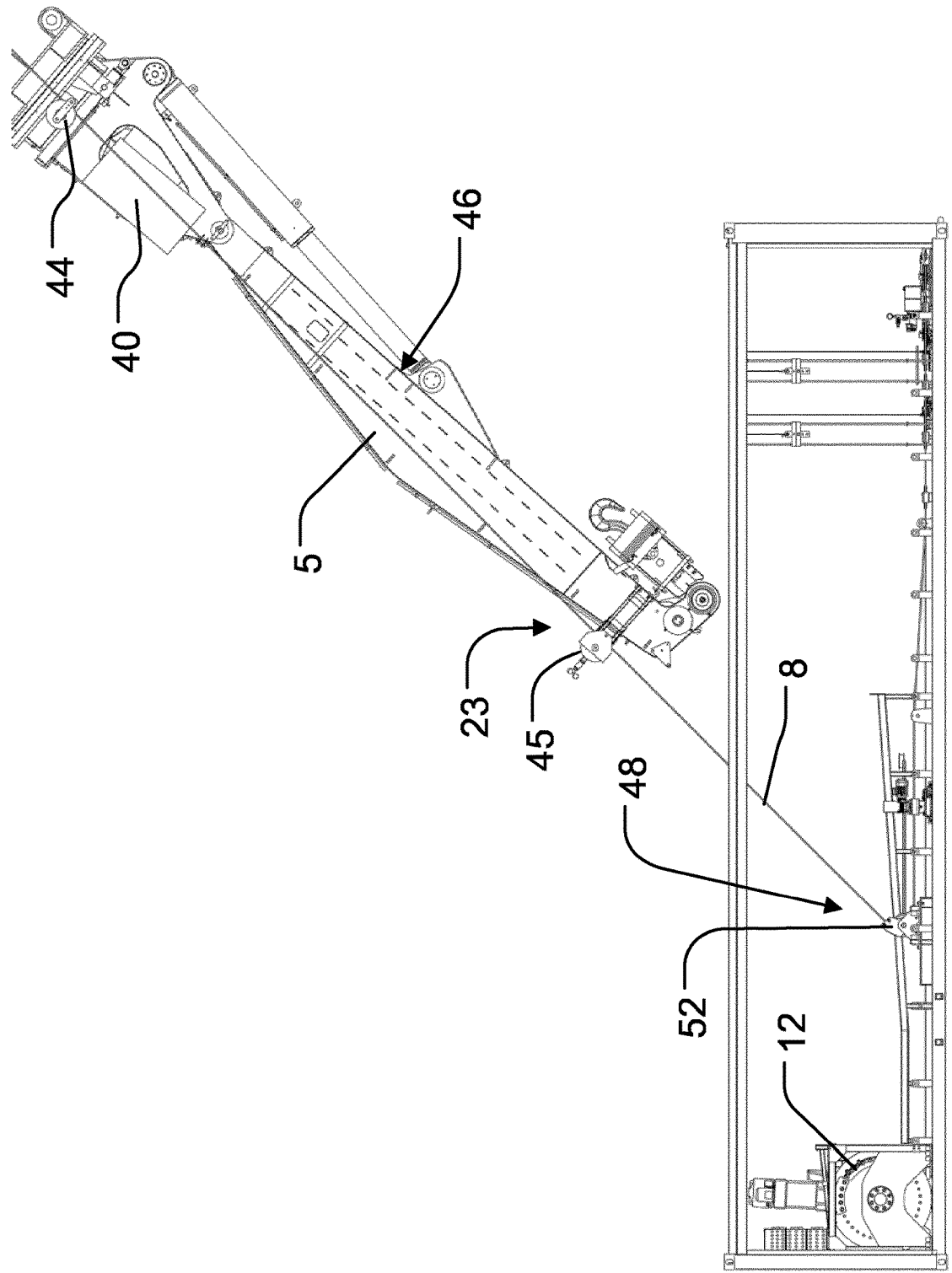
FIG. 16 is a side view of the container corresponding to that of FIG. 14, whereby the entire self-hoisting crane has been lifted to a position above the container.
Figure 17:
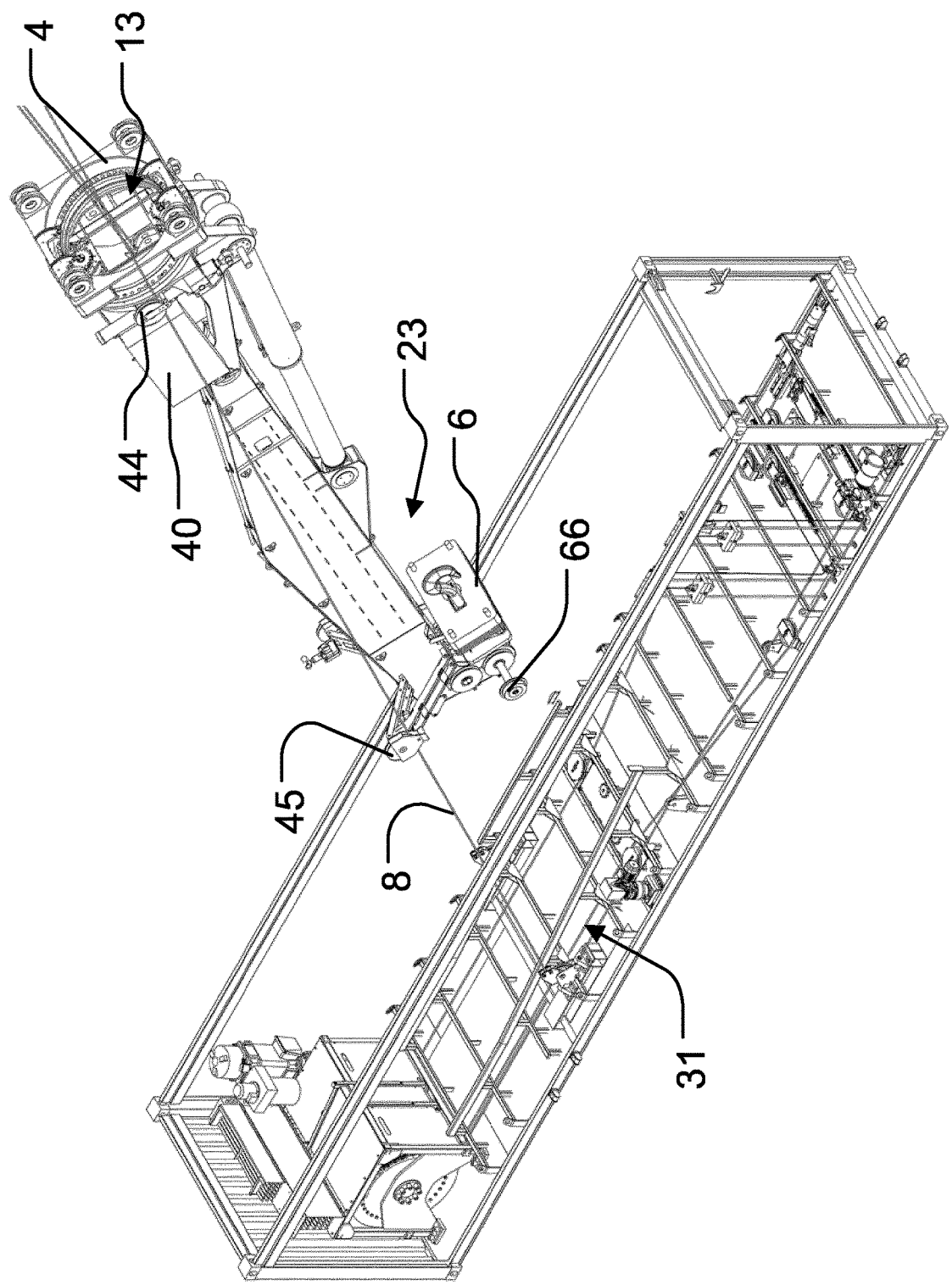
FIG. 17 is a perspective view of the container and self-hoisting crane of FIG. 16.
Figure 19:
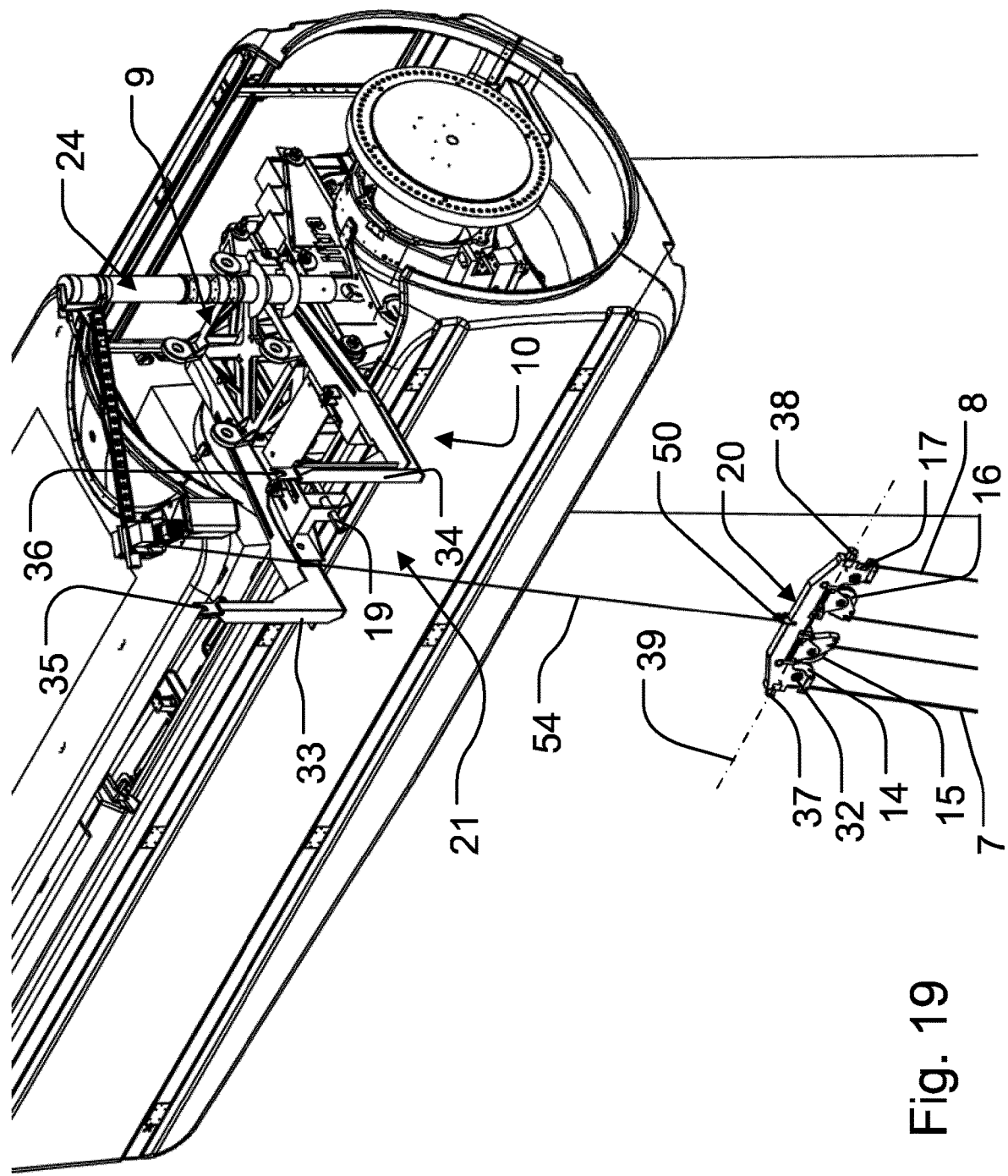
FIG. 19 illustrates the nacelle and hoisting block of FIG. 18 on a larger scale.
Figure 20:
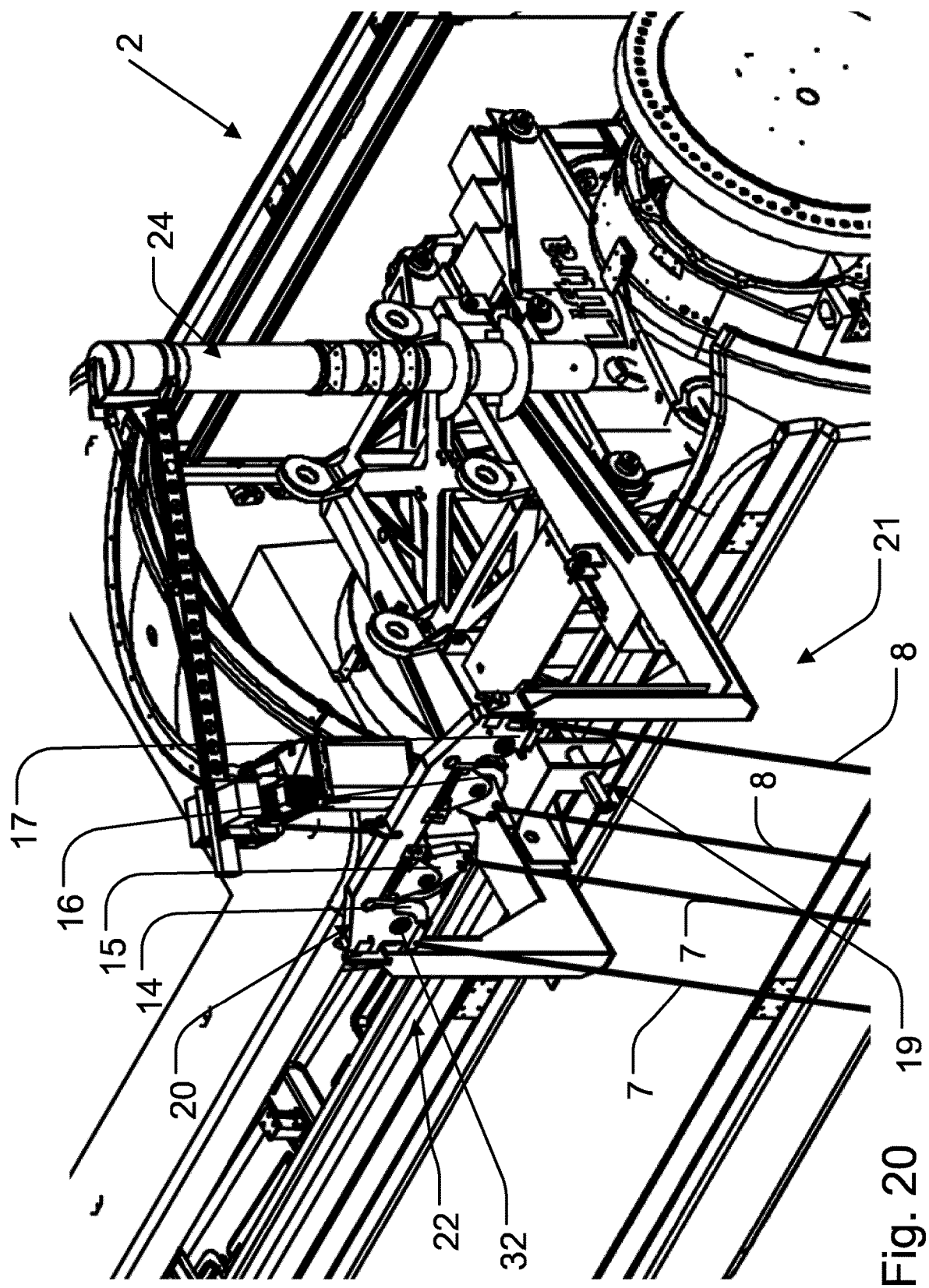
FIG. 20 is a view corresponding to that of FIG. 19, whereby the hoisting block has been placed in forks of a jib of the crane base.
Figure 22:
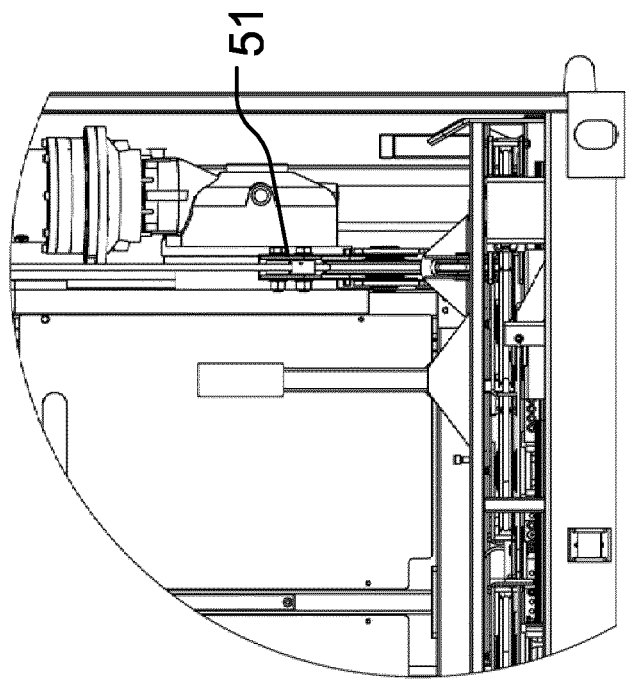
FIG. 22 illustrates a detail of FIG. 21, as indicated by means of a circle, on a larger scale.
Figure 21:
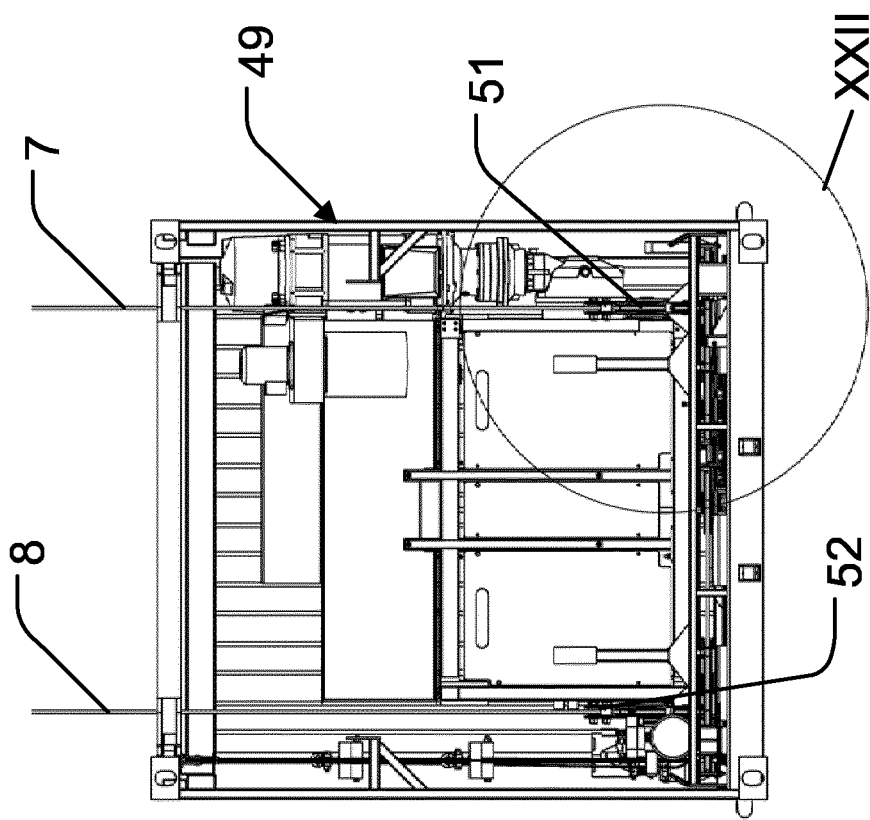
FIG. 21 is an end view seen from the right end of the container of FIG. 17, wherein the container has been placed on a horizontal surface of the ground.
Figure 24:
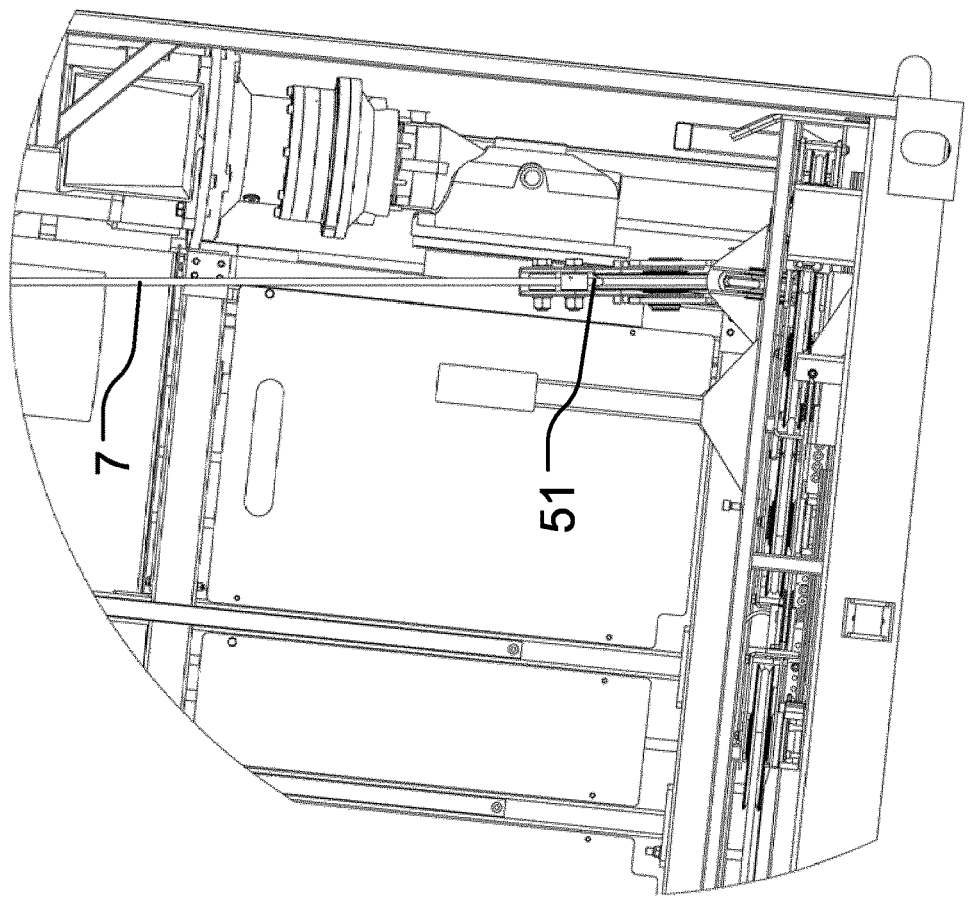
FIG. 24 illustrates a detail of FIG. 23, as indicated by means of a circle, on a larger scale.
Figure 23:
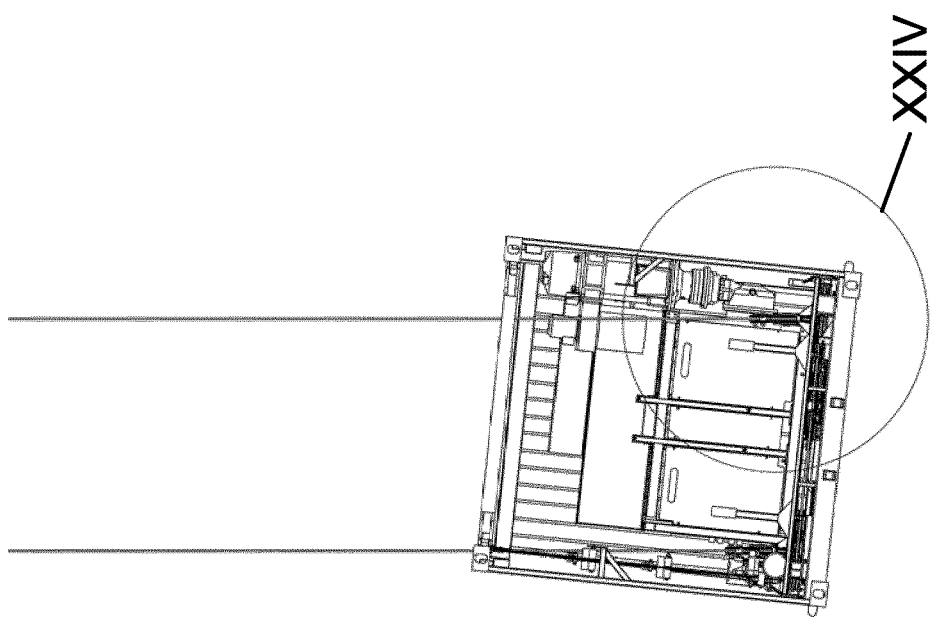
FIG. 23 is an end view of the container corresponding to that of FIG. 21, however in a situation where the container has been placed on an oblique surface of the ground.
Figure 25:
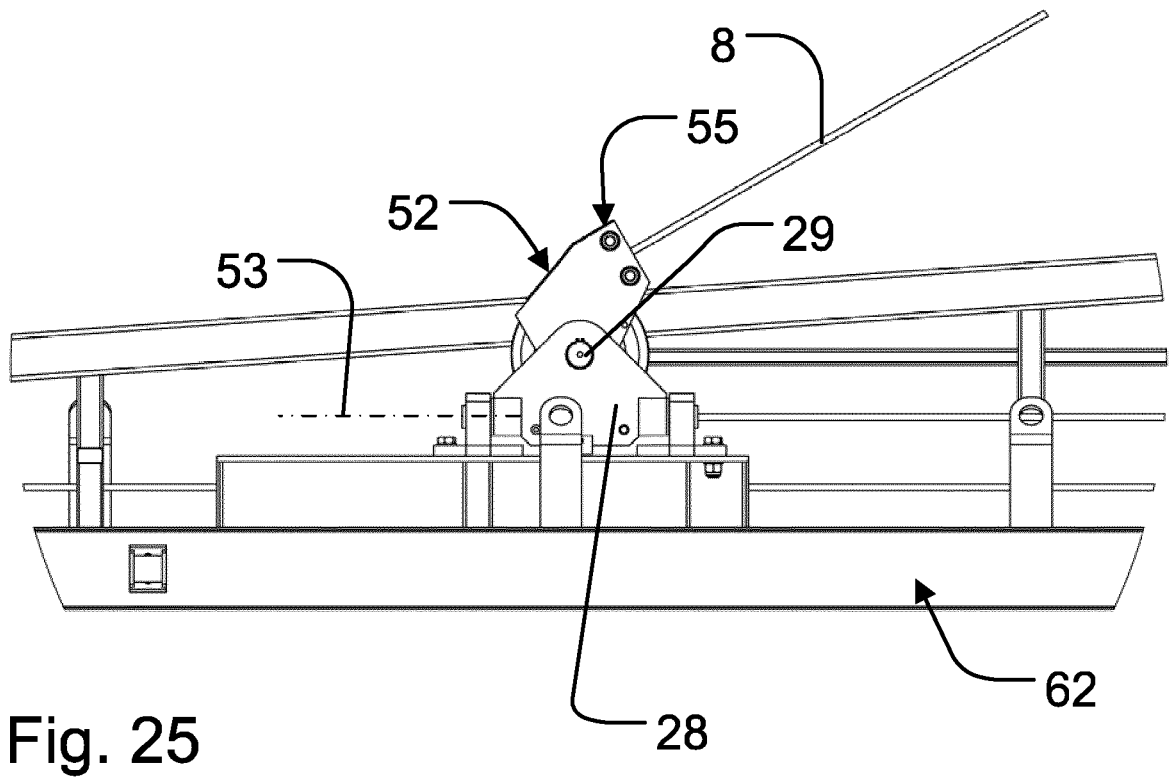
FIG. 25 is a side view of an exit sheave of the self-hoisting crane system as illustrated in FIG. 10, on a larger scale.
Figure 26:
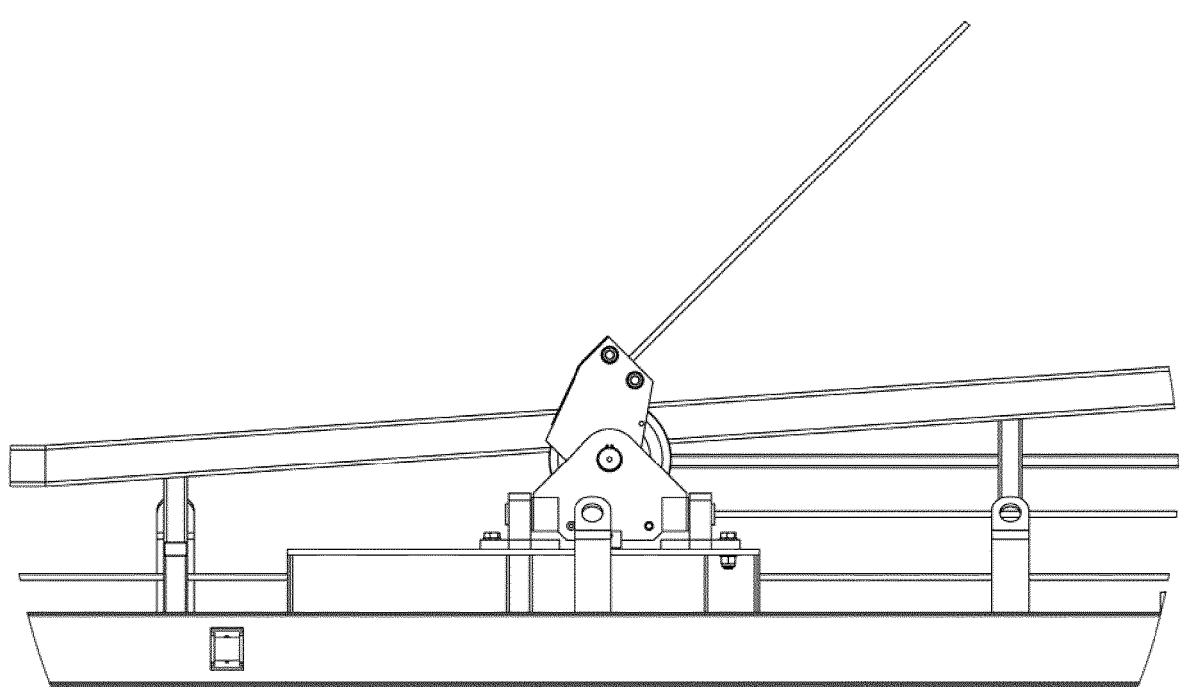
FIG. 26 is a side view of an exit sheave of the self-hoisting crane system as illustrated in FIG. 16, on a larger scale.

As seen in FIG. 13, the self-hoisting crane 1 includes a pedestal 4, an arm base 40, a boom arm 5, a hook block 6 arranged at a tip end 23 of the boom arm 5 and a left and a right cable 7, 8 adapted to lift or lower the hook block 6 for operation of the self-hoisting crane 1 in its mounted position on the nacelle 2. The pedestal 4 is adapted to be mounted on a crane base 10 arranged on the nacelle 2, as seen in FIGS. 19 and 20. Referring to FIGS. 16 and 17, the arm base 40 is provided with a left and a right base roller 44, and the tip end 23 of the boom arm 5 is provided with a left and a right boom arm roller 45.

The self-hoisting crane 1 is adapted to be hoisted from the container 49 to the nacelle 2 by operating the cable winch 12 in the container 49, whereby the cables 7, 8 are extended from the cable winch 12 in the first end 26 of the container, to the second end 27 of the container where they change direction by being lead around respective end sheaves 81, around a left and a right exit sheave 51, 52, respectively, arranged in the container, and exit the container 49 from the exit sheaves 51, 52 in an upward direction in order to pass around respective rollers 14, 15, 16, 17 of a hoist block 20 arranged at the crane base 10 and continue in a downward direction to the self-hoisting crane 1, enter through a central opening 13 in the pedestal 4 and continue to the hook block 6. The self-hoisting crane 1 is adapted to be lifted from the container 49 with the pedestal 4 pointing upwards, as seen in FIG. 17, until it reaches the crane base 10 in that the base rollers 44 and the boom arm rollers 45 roll on the respective cables 7, 8. As illustrated in FIGS. 11 to 15, the container 49 includes a guide system 31 guiding the tip end 23 of the boom arm 5 during part of the lifting and lowering of the self-hoisting crane 1 from and to the container 49.

Figure 1:
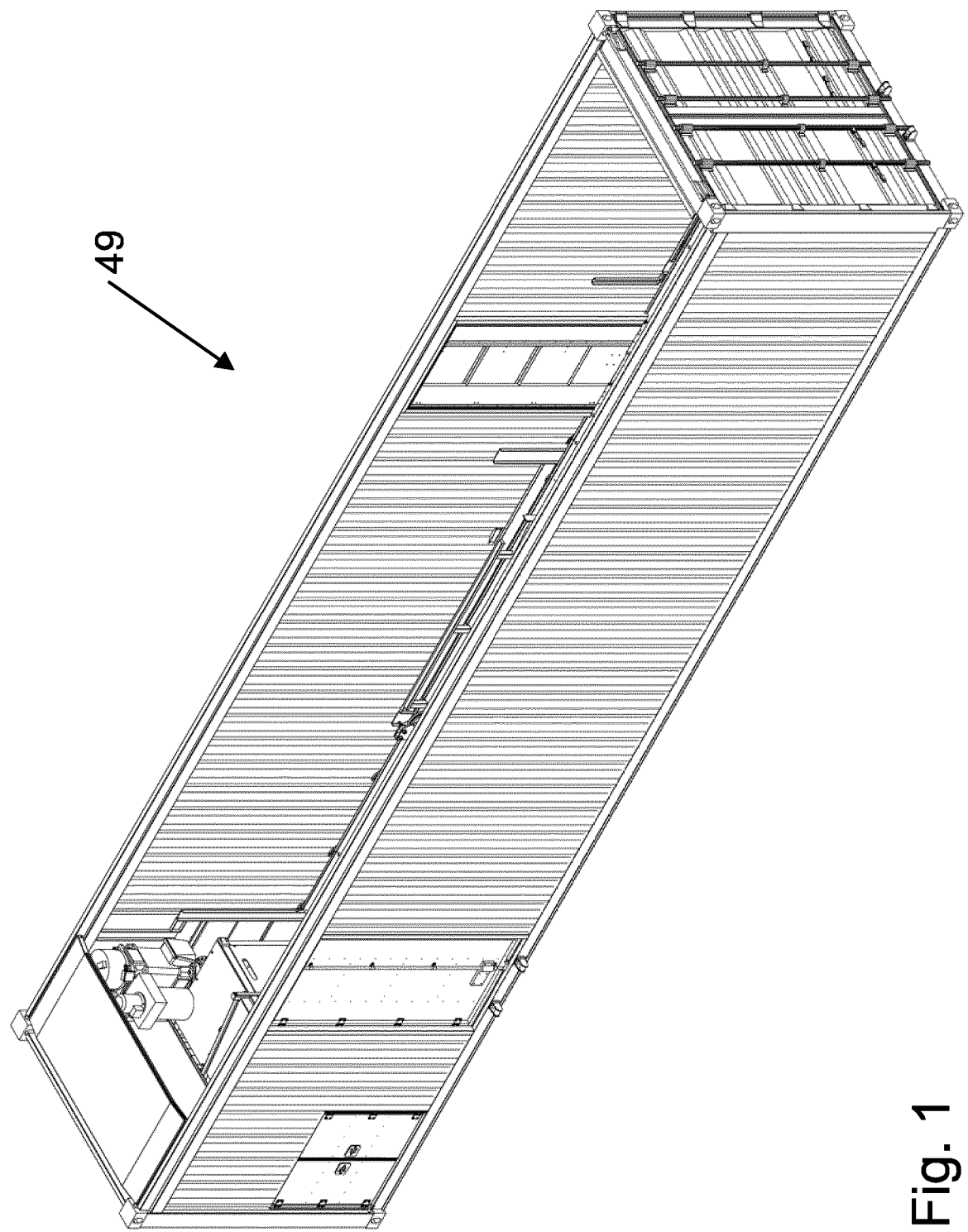
Figure 2:
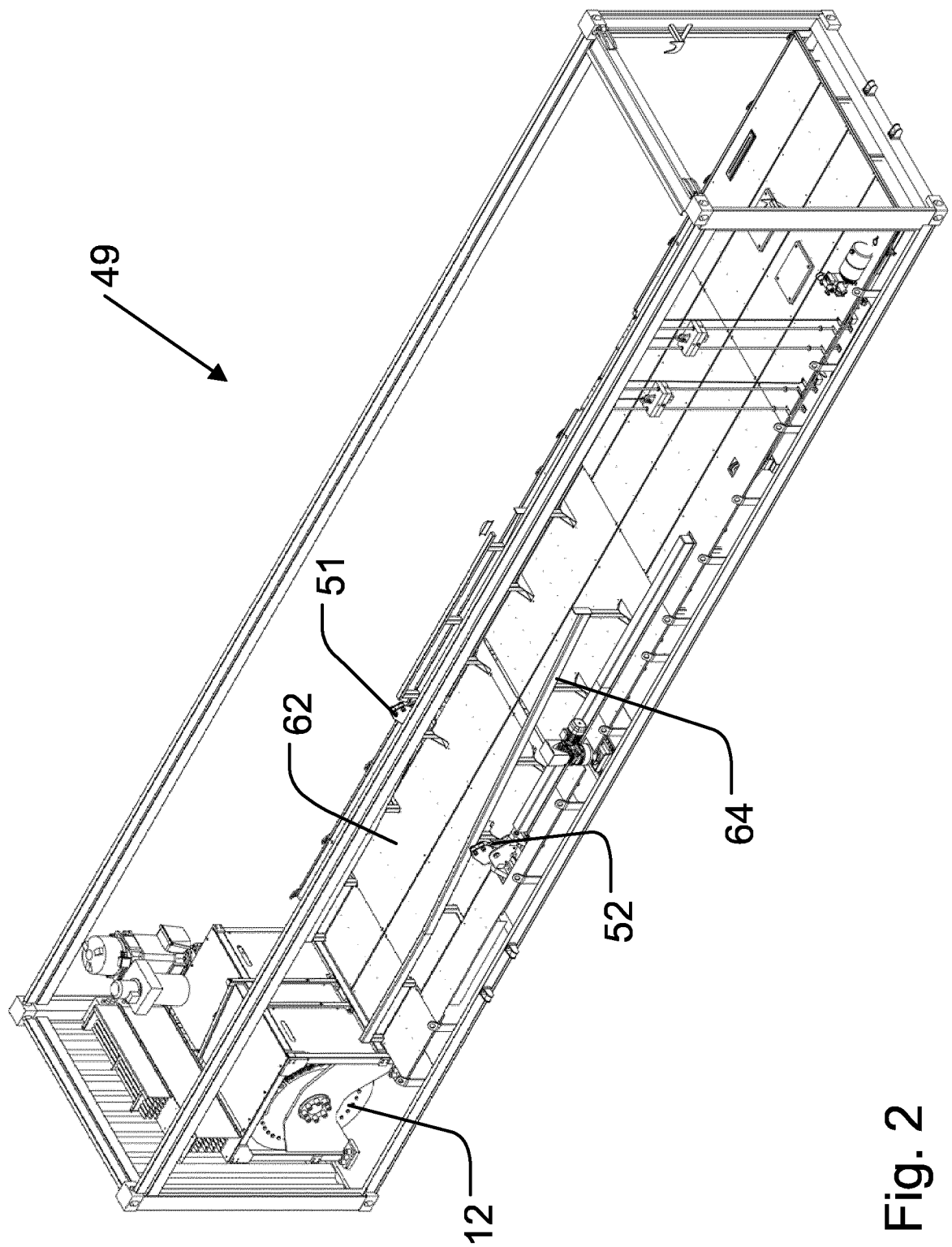
FIG. 2 is a perspective view of the container of FIG. 1, whereby the walls have been removed.
Figure 3:
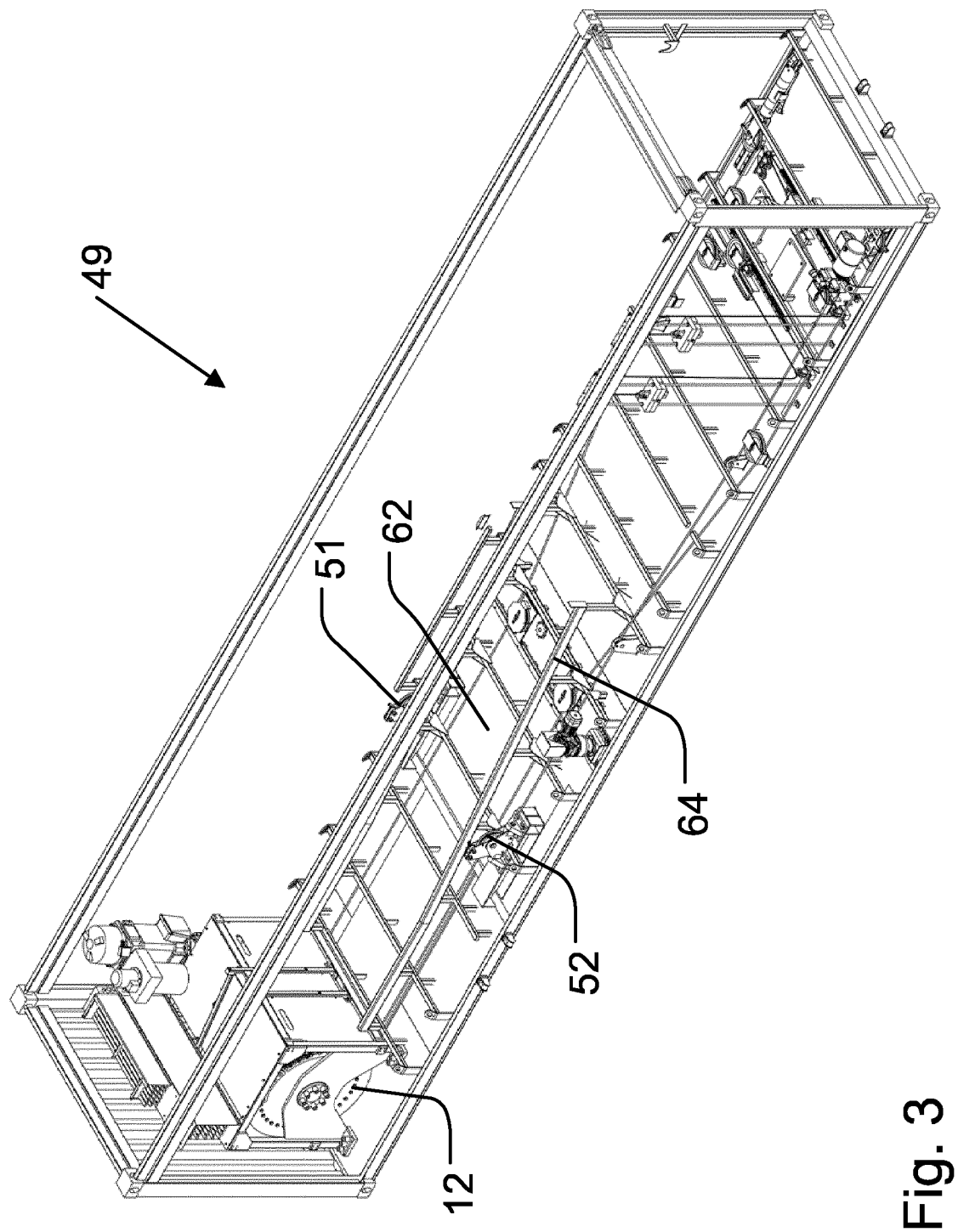
FIG. 3 is a perspective view of the container of FIG. 2, whereby furthermore the floor has been removed.
Figure 6:
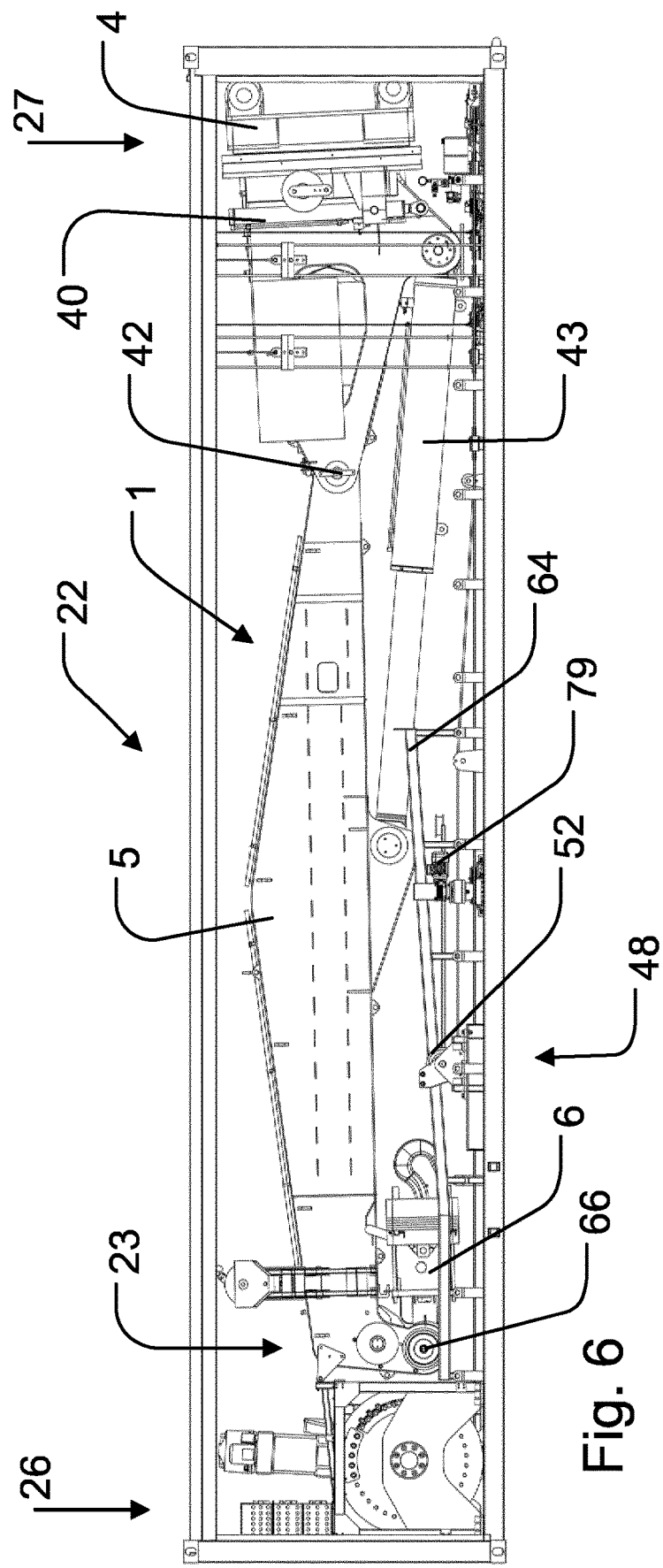
FIG. 6 is a side view of the container corresponding to that of FIG. 4, whereby the self-hoisting crane has been arranged in the container.
Figure 7:
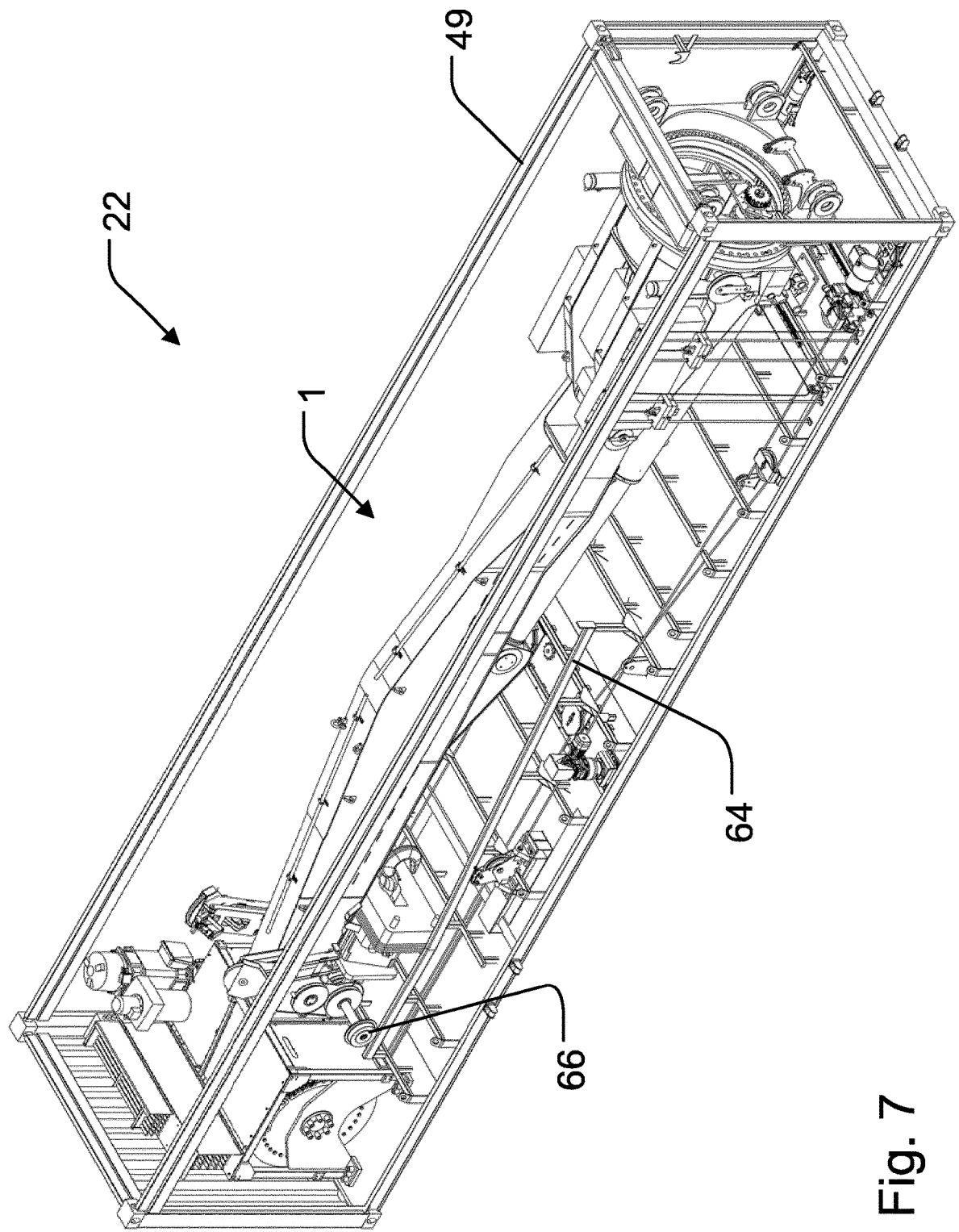
FIG. 7 is a perspective view of the container and self-hoisting crane of FIG. 6.
Figure 8:
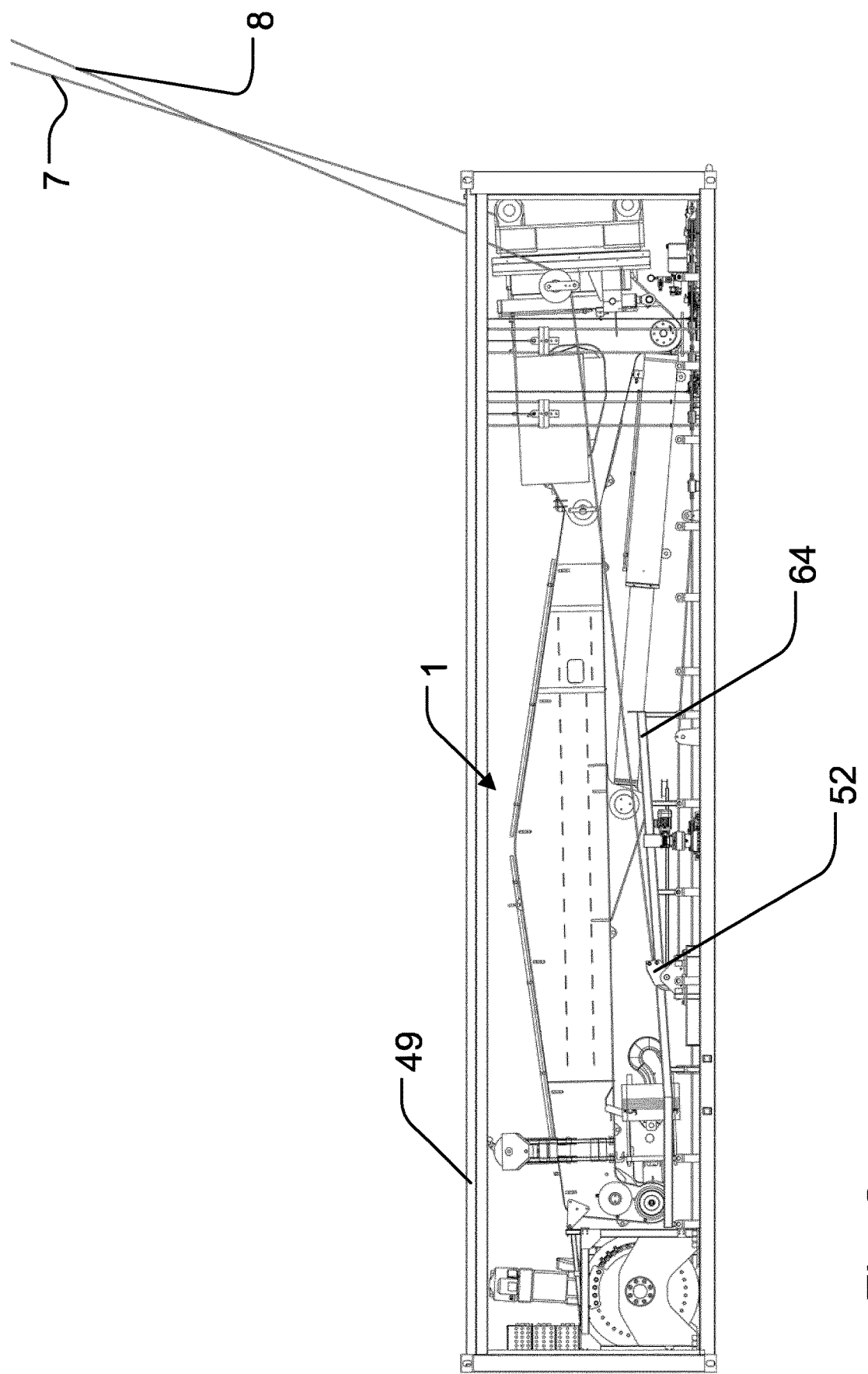
FIG. 8 is a side view of the container corresponding to that of FIG. 6, whereby a first and second cable has been extended from the container to a crane base at the nacelle of a wind turbine.
Figure 9:
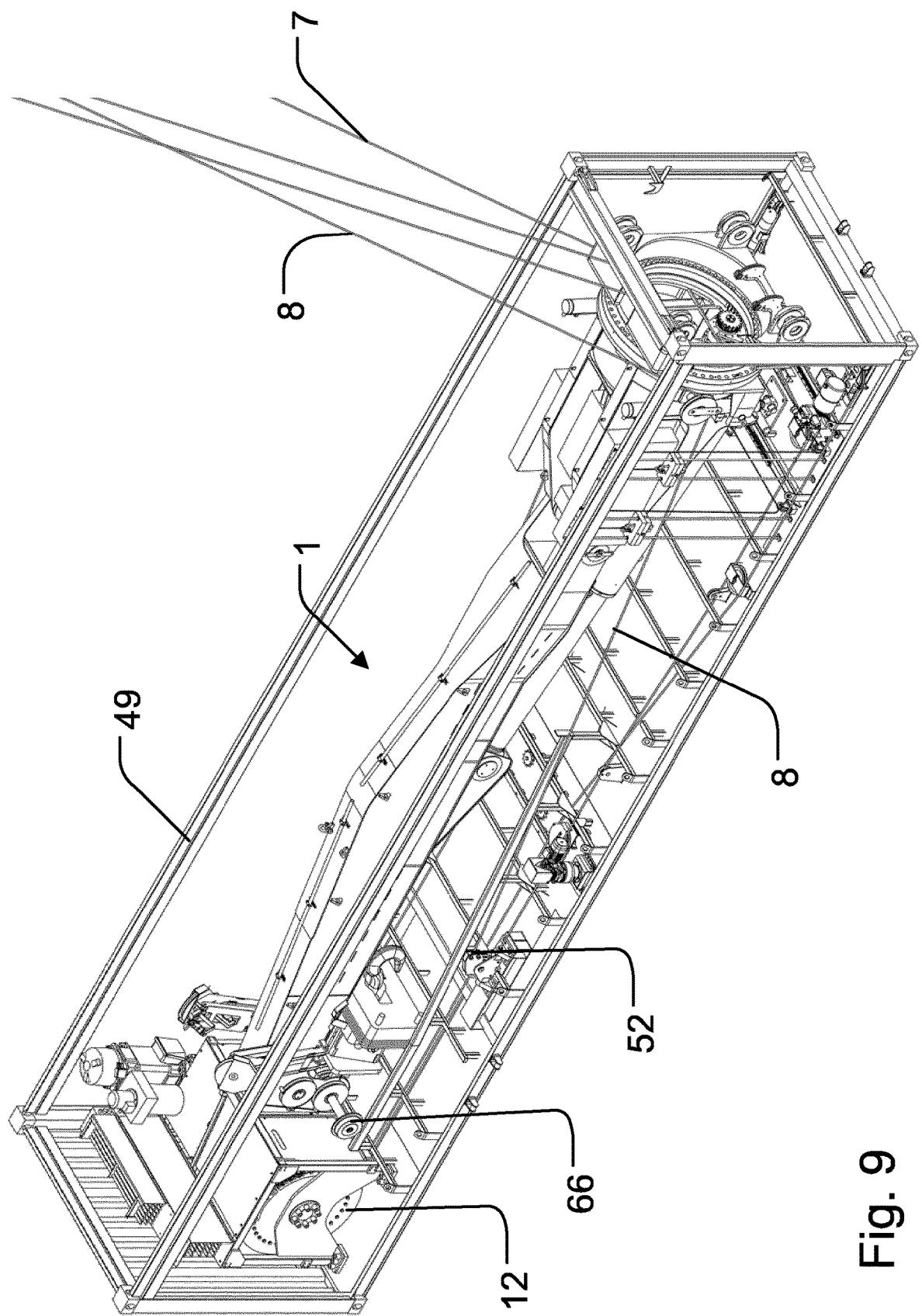
FIG. 9 is a perspective view of the container and self-hoisting crane of FIG. 8.
Figure 10:
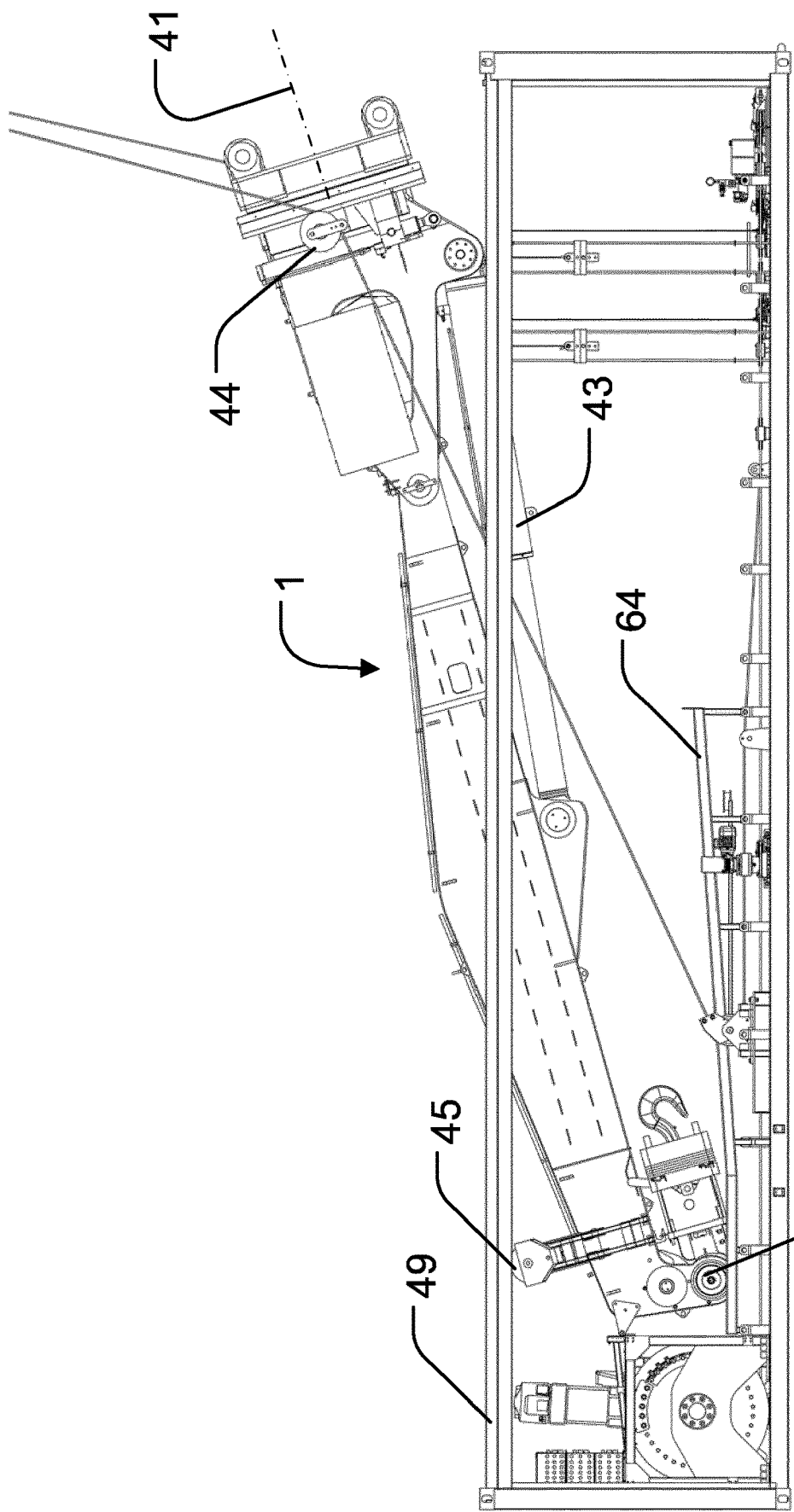
FIG. 10 is a side view of the container corresponding to that of FIG. 8, whereby the pedestal end of the self-hoisting crane has been lifted somewhat up from the container.
Figure 11:
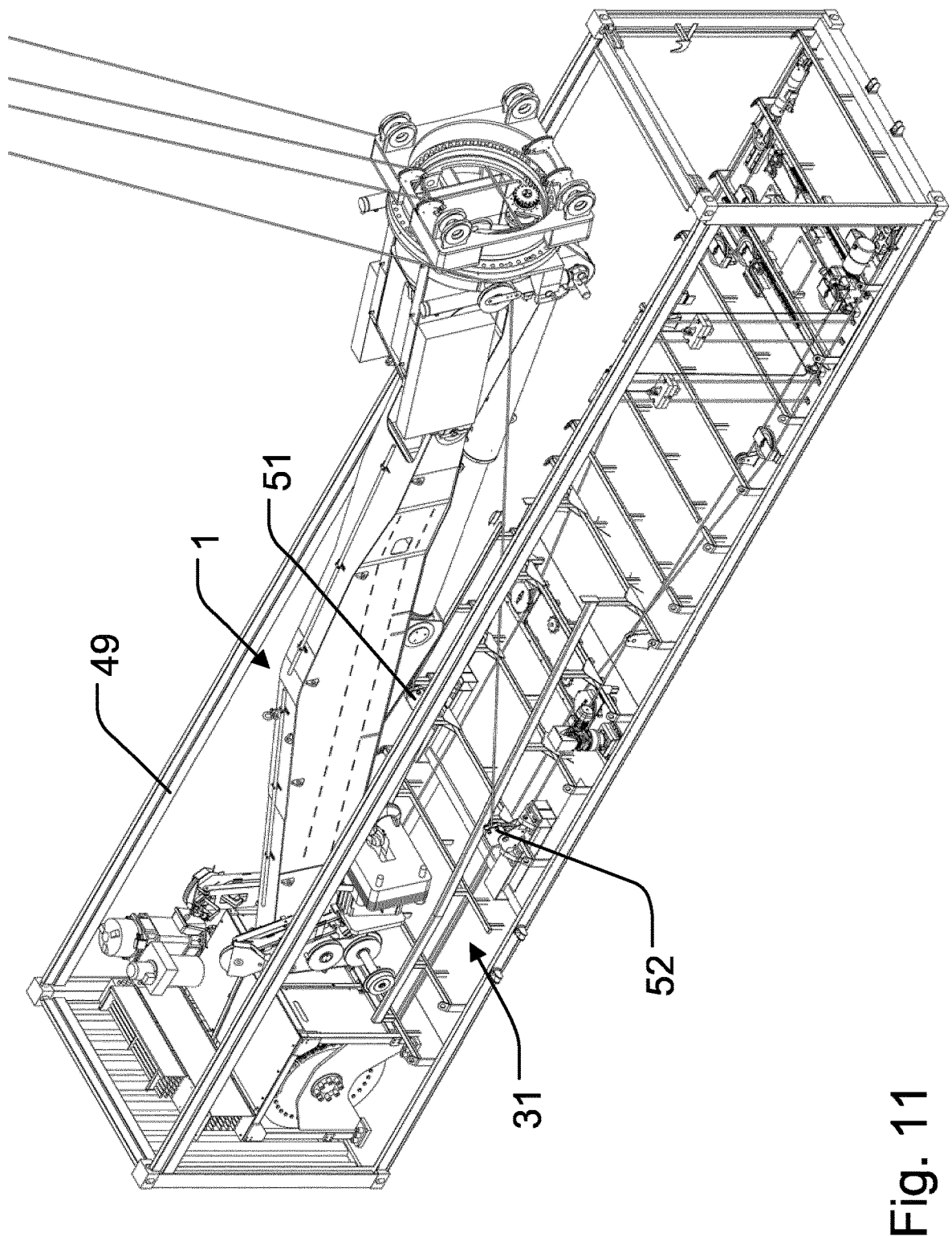
FIG. 11 is a perspective view of the container and self-hoisting crane of FIG. 10.
Figure 12:
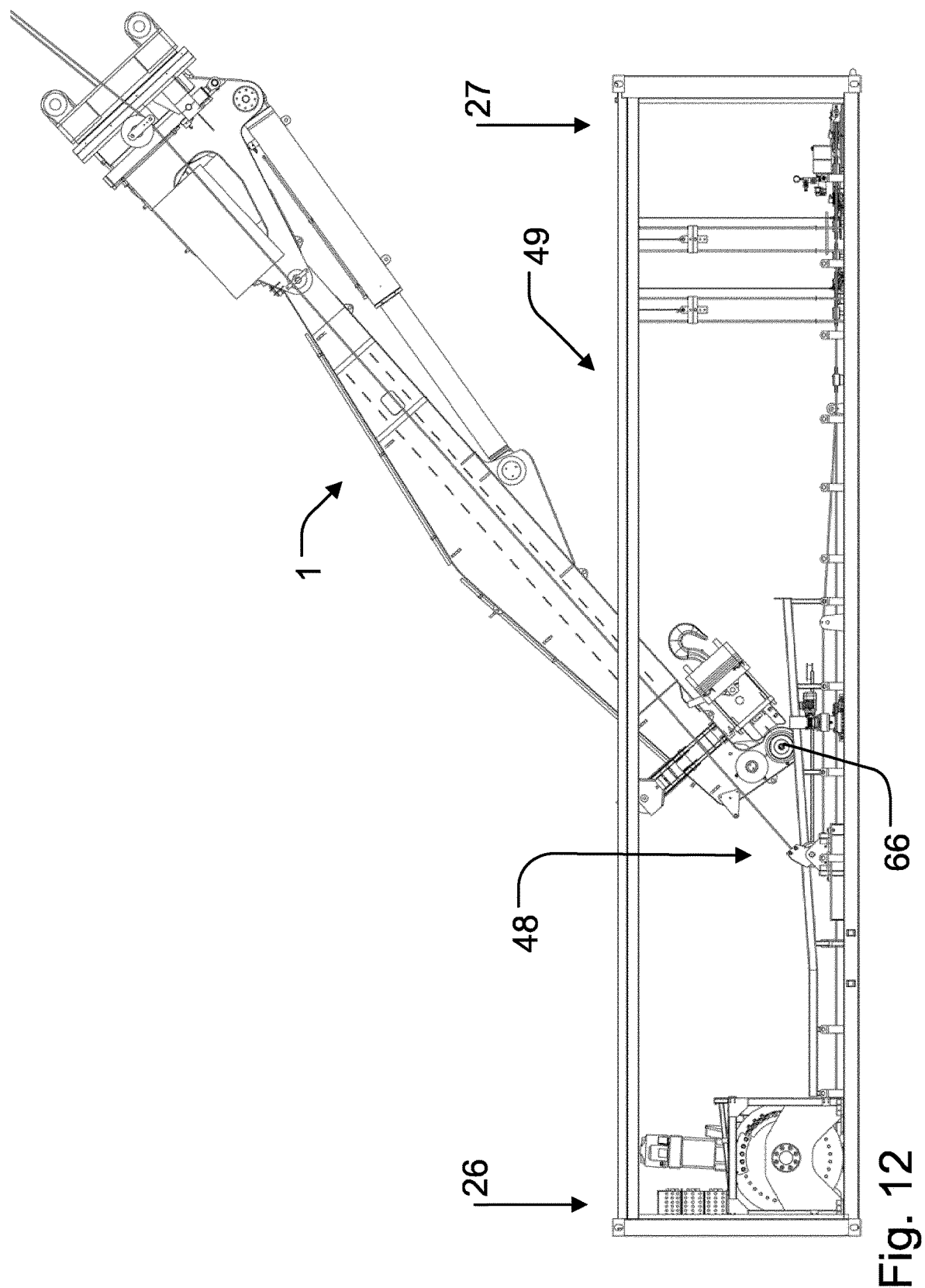
FIG. 12 is a side view of the container corresponding to that of FIG. 10, whereby the pedestal end of the self-hoisting crane has been lifted further up from the container.

The container including cable winch 12, guide system 31, exit sheave 51, 52 and any auxiliary hoisting equipment located in the container 49, but excluding the self-hoisting crane 1, has a centre of gravity 48 located at a longitudinal position between the first and second ends 26, 27 on the container 49, as indicated in FIG. 12. According to the present invention, the exit sheaves 51, 52 are located at a longitudinal position of the container 49 deviating not more than 10 percent of the length of the container from the longitudinal position of the centre of gravity 48 of the container. In an embodiment, the exit sheaves 51, 52 are located at a longitudinal position of the container 49 deviating not more than 5 percent of the length of the container from the longitudinal position of the centre of gravity 48 of the container. Preferably, as seen in FIG. 12, the exit sheaves 51, 52 are located at least substantially at the longitudinal position of the centre of gravity 48 of the container.

As illustrated in FIGS. 25 to 28, the exit sheaves 51, 52 are arranged rotationally in a sheave housing 28 about an axis of rotation 29 being at least substantially at right angles to the longitudinal direction D of the container 49, and each sheave housing 28 is arranged pivotally in relation to the container 49 about a pivot axis 53 extending in the longitudinal direction D of the container 49. Thereby, each exit sheave 28 may better confirm to the angle of the respective cable 7, 8 extending from the container 49 to the crane base 10 at the nacelle 2, and thereby it may be ensured that the cable is better guided by the exit sheave 28. This may be advantageous, because the rolling angle of the container, which is defined as the rotation about the longitudinal axis D of the container 49 in relation to the horizontal, may vary as a result of the surface of the ground 11 at the particular location next to the wind turbine 3, as illustrated in FIGS. 21 to 24.

Furthermore, as seen in FIGS. 25 to 28, the sheave housing 28 is provided with a cable guide 55 being arranged rotationally in the sheave housing 28 about the axis of rotation 29 of the exit sheave 51, 52. Thereby, it may be ensured that the cable 7, 8 follows and is maintained in contact with the groove of the exit sheave 51, 52 at varying angles between the cable 7, 8 and a floor 62 of the container 49. Each cable guide 55 has the form of a first and a second plate 56, 57 arranged on respective sides of the exit sheave 51, 52, and the first and second plates 56, 57 are connected by means of a first and a second guide roller 58, 59 having respective axes of rotation being parallel to the axis of rotation 29 of the exit sheave 51, 52. The cable 7, 8 exits from the exit sheave in the direction of the self-hoisting crane 1 between the first and second guide rollers 58, 59. Thereby, the exit sheave 51, 52 may even better confirm to the angle of the cable 7, 8 extending from the container 49 to the crane base 10 at the nacelle and thereby it may be ensured that the cable is better guided by the exit sheave. The exit angle of the cables 7, 8 from the exit sheaves varies during hoisting, as seen in FIGS. 10 to 17. Furthermore, the pitch angle of the container 48, which is defined as the rotation about the transverse axis of the container in relation to the horizontal, may also vary from case to case as a result of the surface of the ground 11 at the particular location next to the wind turbine 3.

Figure 27:
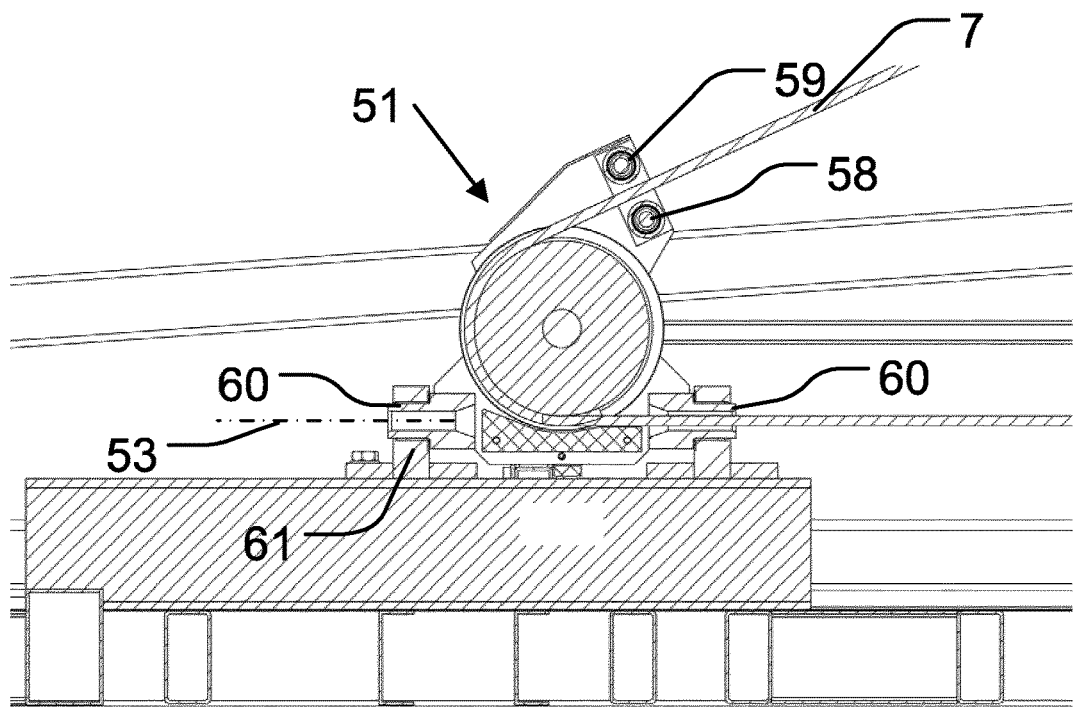
FIG. 27 is a sectional view of an exit sheave of the self-hoisting crane system according to the invention, whereby the section is along the longitudinal direction of the container.
Figure 28:
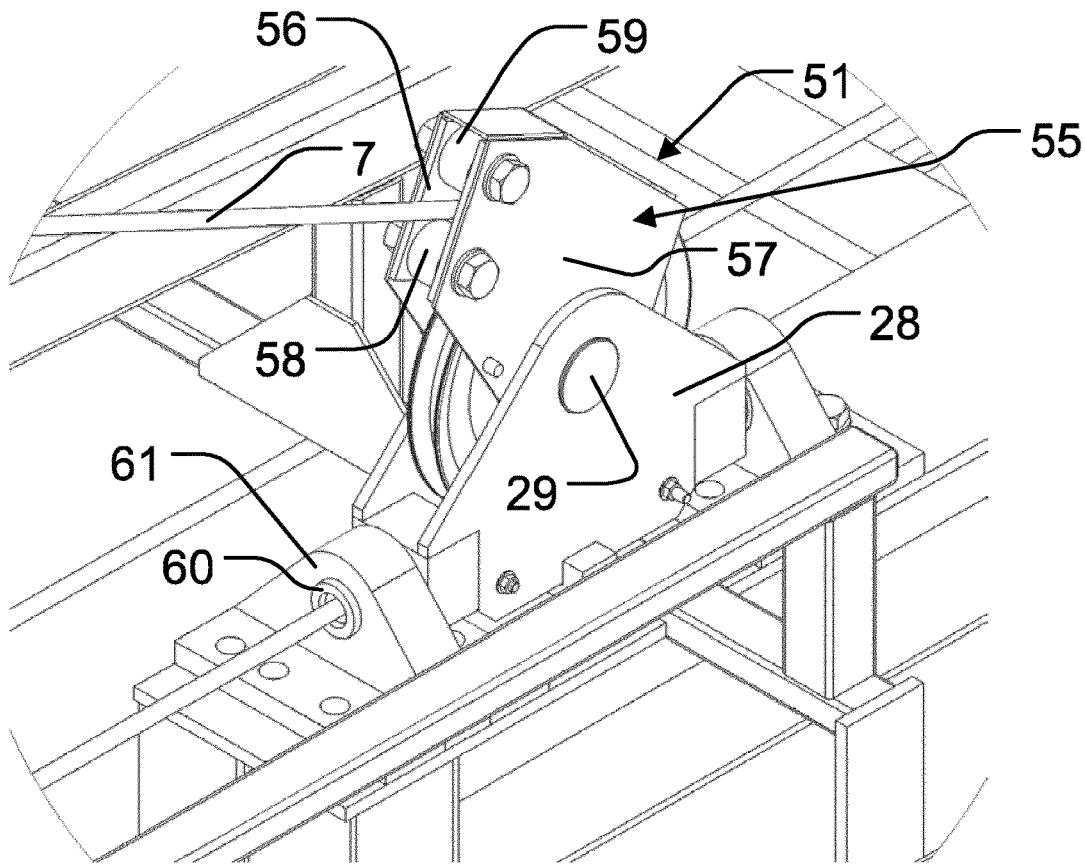
FIG. 28 is a perspective view of the exit sheave of FIG. 27.
Figure 31:
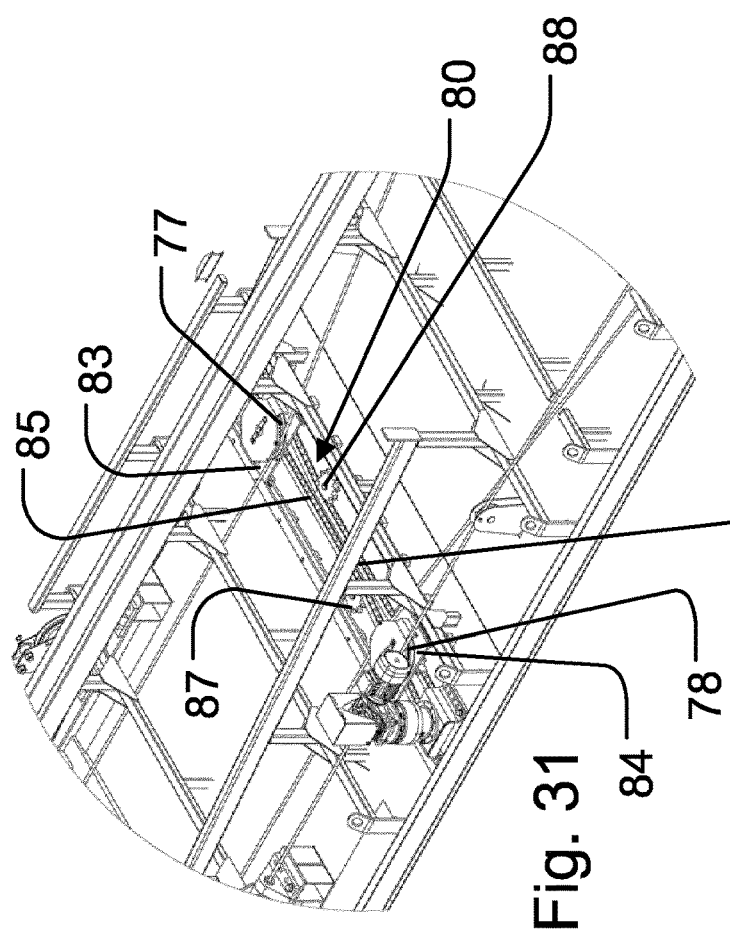
FIG. 31 is a perspective view of a spooling system of the self-hoisting crane system according to the invention, seen in a second position of the spooling system.
Figure 32:
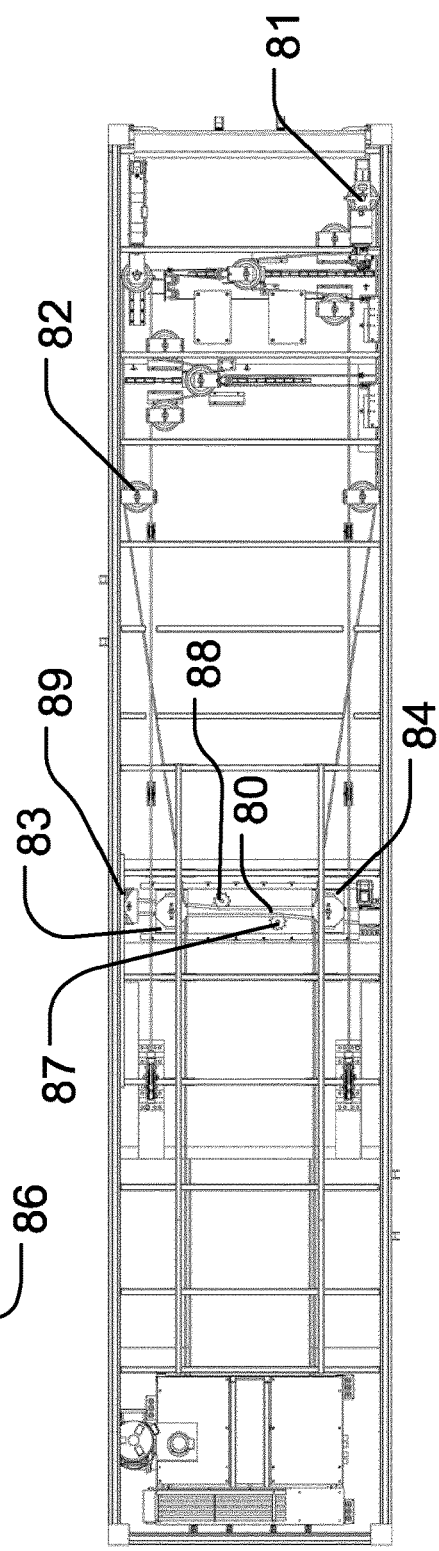
FIG. 32 is a top view of the container as seen in FIG. 5, however wherein the spooling system is positioned as seen in FIG. 31.

In the illustrated embodiment, as particularly seen in FIGS. 27 and 28, the sheave housing 28 is arranged pivotally about the pivot axis 53 in that a tubular spindle 60 of the sheave housing 28 is arranged pivotally in a sheave bracket 61 mounted on a floor 62 of the container 49, and the cables 7, 8 extend from the cable winch 12 via auxiliary sheaves 82 and the end sheaves 81 to the exit sheaves 51, 52 through the tubular spindle 60. The cables 7, 8 may further pass other auxiliary sheaves.

The guide system 31 of the container 49 includes a left and a right guide rail 63, 64, and the tip end 23 of the boom arm 5 of the self-hoisting crane 1 is provided with a left and a right guide roller 66 adapted to roll on the respective guide rails 63, 64. Each guide rail 63, 64 is inclined in upward direction in relation to the floor 62 of the container 49 in the longitudinal direction D of the container in the direction from the first end 26 to the second end 27 of the container. Thereby, during lifting of the self-hoisting crane 1 out of the container 49, a smoother operation may be achieved by lifting the crane so that the tip end 23 of the boom arm 5 follows the guide rails 63, 64 in the upwardly inclined direction. Furthermore, when subsequently lowering the self-hoisting crane 1 into the container, it may be ensured that the tip end of the crane follows the guide rail in the desired direction. The tip end of the crane will follow the guide rail in the direction in which the guide rail is downwardly inclined. Thereby, the crane will automatically arrange itself correctly in the container and be ready to be lifted out of the container again.

As illustrated in FIGS. 33, 34, the container 49 is provided with a ballast system 65 including a first and a second ballast sheave 67 being arranged displaceably in a transverse direction of the container 49. Each cable 7, 8 extends from the cable winch 12 about the respective ballast sheave 67 and to the crane 1. A respective ballast weight 69 is hanging in a first end 71 of a ballast cable 70 and the respective ballast sheave 67 is adapted to be pulled by the ballast cable 70 in the transverse direction of the container, whereby the ballast cable 70 extends over a number of rollers 73 attached to the container 49. Referring to FIG. 33, each ballast cable 70 changes direction from upwards to downwards in that it passes over a not visible roller 73 at the top of the container 49. Each ballast sheave 67 is adapted to be pulled by the ballast cable 70 in that the ballast cable 70 passes a ballast cable roller 75 attached to a ballast sheave bracket 74 in which the ballast sheave 67 is rotationally arranged. A second end 72 of the ballast cable 70 is fixed to the container 49. Thereby, it may be ensured that the cables 7, 8 are always under tension during hoisting. It may thereby automatically be prevented that the cables get stuck or tangled during unwinding of the cables from the cable winch 12.

As illustrated in FIG. 5, the cable winch 12 includes a first and a second mirrored cable winches 12', 12" for the respective first and second cables 7, 8. The first and a second cable winches are rotatably arranged about a common axis of rotation extending in a transverse direction of the container 49, and the container is provided with a spooling system 76 as further illustrated in FIGS. 29 to 32. The spooling system 76 includes a first spooling sheave 77 guiding the first cable 7 during spooling on the first winch 12' and a second spooling sheave 78 guiding the second cable 8 during spooling on the second winch 12". The first and second spooling sheaves 77, 78 are mounted rotatably on respective first and second slides 83, 84 arranged displaceably in the transverse direction of the container 49, and a common motor drive 79 is arranged to displace the first and second slides 83, 84 in opposite directions by means of chain drive 80. In the illustrated embodiment, the chain drive includes a first chain part 85 and a second chain part 86. The first chain part 85 has a first end fixed to the first slide 83 and a second end fixed to the second slide 84. On its way from the first slide 83, the first chain part 85 firstly passes a first auxiliary gear wheel 87 arranged rotatably at the floor 62 of the container 49 and subsequently passes a not visible gear wheel of the common motor drive 79. The second chain part 85 has a first end fixed to the first slide 83 and a second end fixed to the second slide 84. On its way from the first slide 83, the second chain part 86 firstly passes a gear wheel 89 arranged at an opposite side of the container in relation to the common motor drive 79, in order to change its direction by 180 degrees, and subsequently passes a second auxiliary gear wheel 88 arranged rotatably at the floor 62 of the container 49. Of course, although in the illustrated embodiment, first and second chain parts 85, 86 are fixed to the first and second slides, it would also be possible to use one endless chain being fixed at the respective first and second slides 83, 84. Of course, instead of a chain drive, a belt drive, for instance a cogged belt drive, could be used. As understood, by means of the single motor drive 79 which is controlled to change its direction of rotation at intervals, it may be avoided that the first or second cable starts following a wrong groove of the corresponding cable winch during winding of the cable.

Figure 35:
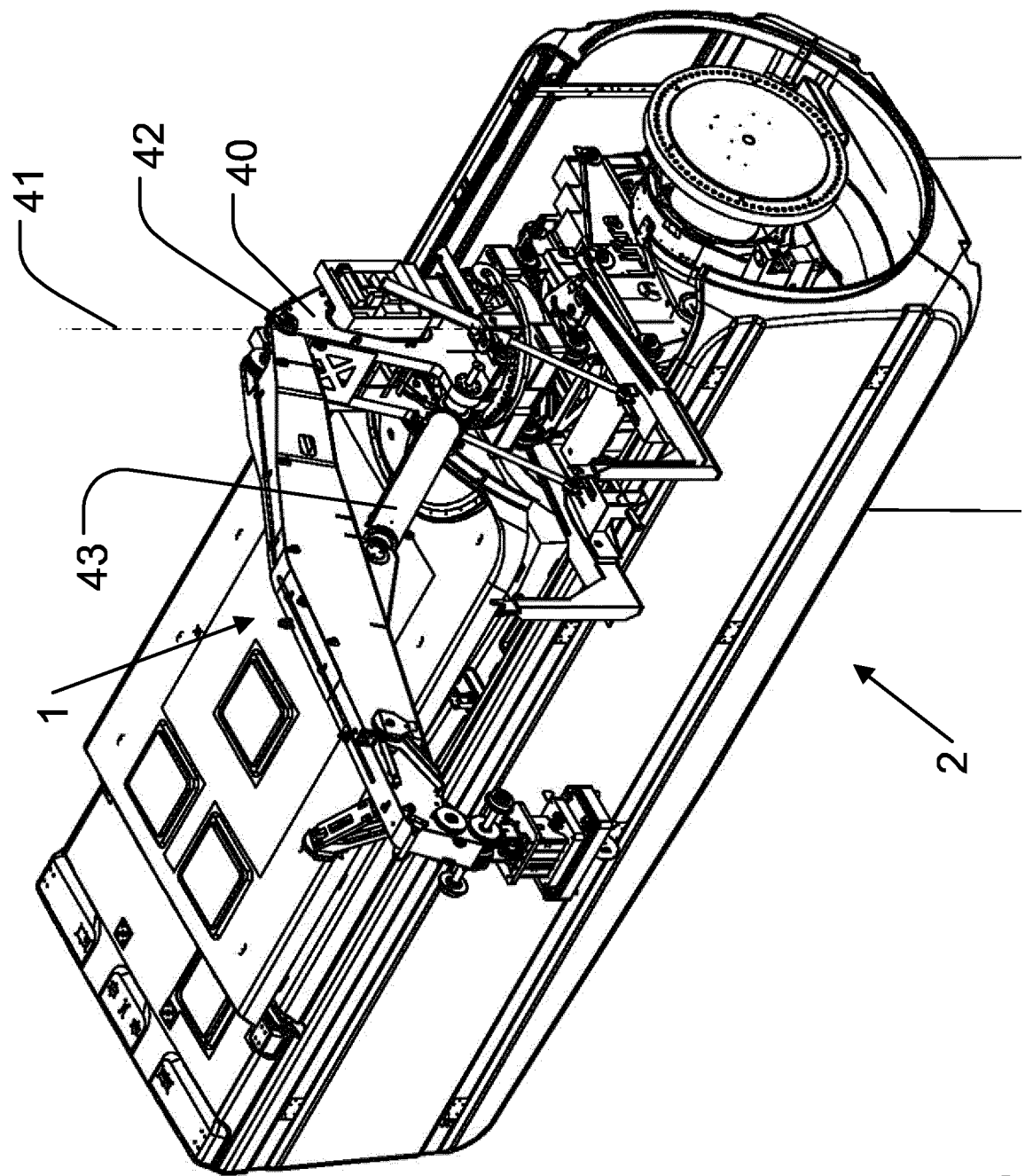
FIG. 35 is a perspective view of a self-hoisting crane according to an embodiment of the present invention.

As seen in FIG. 35, the arm base 40 is arranged rotatably about an arm base axis 41 on the pedestal 4, the arm base axis 41 being vertical in the operational position of the self-hoisting crane 1, and the boom arm 5 is arranged pivotally about a boom arm axis 42 on the arm base 40, the boom arm axis 42 being horizontal in the operational position of the self-hoisting crane 1. A linear boom actuator 43 is arranged between the arm base 40 and the boom arm 5 and is displaceable between a retracted position in which the boom arm 5 is lowered in the operational position of the self-hoisting crane 1 and an extended position in which the boom arm 5 is lifted in the operational position of the self-hoisting crane. As illustrated in FIG. 16, in the extended position of the linear boom actuator 43, a centre of gravity 46 of the self-hoisting crane 1 is below a straight line between the respective axes of the base rollers 44 and of boom arm rollers 45 when the base rollers 44 and the boom arm rollers 45 roll on their corresponding cables 7, 8 and the linear boom actuator 43 is positioned under the boom arm 5 during hoisting of the self-hoisting crane 1 to the nacelle 2 of the wind turbine 3. Thereby, by arranging the centre of gravity 46 of the self-hoisting crane 1 below the straight line between the respective axes of the base rollers and of the boom arm rollers during hoisting of the self-hoisting crane 1 to the nacelle 2, the crane may be lifted out of the container 49 to the nacelle 2 in a stable position and the hoisting procedure and subsequent mounting of the crane on the nacelle may thereby be facilitated in that additional measures for stabilising the crane during its hoisting may be dispensed with.

By the method of hoisting a self-hoisting crane 1 of a self-hoisting crane system 22 according to the present invention, the self-hoisting crane 1 is transported to and from the wind turbine 3 in the container 49, and the self-hoisting crane 1 is lifted and lowered between the container 49 and the nacelle 2 by operating the cable winch 12 arranged at the first end 26 of the container 49. The cables 7, 8 extend from the cable winch 12 in the container 49, around the exit sheaves 51, 52 arranged in the container 49, exit the container 49 from the exit sheaves 51, 52 in an upward direction and subsequently pass around the rollers 14, 15, 16, 17 of the hoist block 20 arranged at the crane base 10 and continues in a downward direction to the self-hoisting crane 1, enters through the central opening 13 in the pedestal 4 and continues to the hook block 6. The self-hoisting crane 1 is lifted from and lowered to the container 49 with the pedestal 4 pointing upwards until it reaches the crane base 10 in that the base rollers 44 and the boom arm rollers 45 roll on the respective cables 7, 8, and the guide system 31 of the container 49 guides the tip end 23 of the boom arm 5 during a first part of the lifting and a last part of the lowering of the self-hoisting crane 1 from and to the container 49. The cables 7, 8 exit the container 49 from the respective exit sheaves 51, 52 so that, during lifting and lowering of the self-hoisting crane 1 from and to the container 49, the tip end 23 of the boom arm 5 leaves and enters the container 49 at an intermediate position between the first and the second end 26, 27 of the container 49. Thereby, substantially the whole weight of the container 49 may provide ballast for the hoisting of the self-hoisting crane 1, whereby the cables 7, 8 may be tensioned by a substantially higher force than according to known solutions. Thereby, the self-hoisting crane may 1 be better stabilised during hoisting of the crane to the nacelle of the wind turbine. During part of the lifting and lowering of the self-hoisting crane 1 from and to the container 49, left and right guide rollers 66 at the tip end 23 of the boom arm 5 of the self-hoisting crane 1 roll on the respective guide rails 63, 64 of the container 49.

As seen in FIG. 19, the rollers 14, 15, 16, 17 are arranged in the hoist block 20, and the crane base 10 includes a jib 21 adapted to, during lifting of the self-hoisting crane 1 to the nacelle 2, carry the hoist block 20 at a first hoist block position above an intermediate second hinge part 19 of the crane base 10 and extended in horizontal direction from the nacelle 2, i.e. spaced horizontally from a wall of the nacelle 2. The self-hoisting crane 1 is provided with an intermediate first hinge part 18 for connection with the intermediate second hinge part 19 of the crane base 10 for pivoting the crane 1 to its correct mounting position as illustrated in FIG. 35.

The hoist block 20 is releasably attachable to the jib 21 in order to be removed from its first hoist block position after hoisting the self-hoisting crane 1 and thereby allow passage of the crane 1 through the first hoist block position when pivoting the crane 1 about the hinge axis of the intermediate first and second hinge parts 18, 19.

As seen in FIG. 20, the jib 21 and the hoist block 20 are adapted so that the hoist block 20 when mounted in its first hoist block position on the jib 21 is pivotal in relation to the jib about a pivot axis 30 being perpendicular to respective axes of rotation 32 of each of the rollers 14, 15, 16, 17 of the hoist block 20. The jib 21 has two spaced arms 33, 34 each being provided with an upwardly open fork-like element 35, 36 in which a respective pivot pin 37, 38 of the hoist block 20 may rest.

As seen in FIGS. 19 and 20, the hoist block 20 is formed as an elongated element being provided at either end with the extending pivot pins 37, 38 arranged coaxially with a longitudinal axis 39 of the hoist block 20. The hoist block 20 has two outer rollers 14, 17 arranged at the respective ends of the hoist block 20 and two inner rollers 15, 16 arranged between the outer rollers 14, 17. The outer and inner rollers 14, 15, 16, 17 are arranged with their axes 32 at a distance from the longitudinal axis 39 of the hoist block 20 and at right angles to the longitudinal axis 39. However, in other embodiments, the outer and inner rollers 14, 15, 16, 17 may be arranged in different ways, and their axes 32 do not need to be at right angles to the longitudinal axis 39 of the hoist block 20. In the illustrated embodiment, however, the axes 32 of the outer rollers 14, 17 are fixed in relation to the elongated element, whereas the axes 32 of the inner rollers 15, 16 are pivotal in relation to the elongated element about an axis being parallel with the longitudinal axis 39 of the hoist block 20 and extending at the periphery of the inner rollers 15, 16 where the cable is arranged in a peripheral track of the rollers 15, 16. In this way, when the hoist block 20 is arranged in its first hoist block position on the jib 21 as illustrated in FIG. 20, during lifting of the crane 1 from the ground 11 to the nacelle 2, the hoist block 20 may adapt its rotational position to the varying angle with the vertical of the four extended parts of two cables 7, 8 being redirected in the hoist block 20. On the other hand, when the hoist block 20 is arranged in a second hoist block position at the mounting position 9 of the pedestal 4 on the crane base 10, and when the crane 1 is mounted at its final position on the nacelle 2, two innermost cable parts extending from the hoist block 20 and up through the central opening 13 in the pedestal 4 of the crane 1 may suitably adapt their angle to the vertical by rotation of the axes 32 of the two inner rollers 15, 16 about the axis being parallel with or co-axial with the longitudinal axis 39 of the hoist block 20. In this second hoist block position, in the final position of the crane 1 and during tilting of the crane 1 to its final position, the cables 7, 8 originating in the crane 1 and passing the respective inner rollers 15, 16, are further led about the respective outer rollers 14, 17 and from there, the cables pass over respective auxiliary rollers of crane base.

LIST OF REFERENCE NUMBERS

D longitudinal direction of container
1 self-hoisting crane
2 nacelle
3 wind turbine
4 pedestal of self-hoisting crane
5 boom arm of self-hoisting crane
6 hook block of self-hoisting crane
7, 8 cable of self-hoisting crane
9 mounting position of pedestal on crane base
10 crane base
11 ground
12 cable winch
13 central opening in pedestal
14 left outer roller of hoist block
15 left inner roller of hoist block
16 right inner roller of hoist block
17 right outer roller of hoist block
18 intermediate first hinge part of self-hoisting crane
19 intermediate second hinge part of crane base
20 hoist block
21 jib
22 self-hoisting crane system
23 tip end of boom arm
24 auxiliary crane on nacelle
25 linear raise actuator on self-hoisting crane
26 first end of container
27 second end of container
28 sheave housing
29 axis of rotation of exit sheave
30 pivot axis of hoist block
31 guide system
32 axis of rotation of roller of hoist block
33, 34 arm of jib
35, 36 upwardly open fork-like element
37, 38 pivot pin of hoist block
39 longitudinal axis of hoist block
40 arm base
41 arm base axis
42 boom arm axis
43 linear boom actuator
44 arm base roller
45 boom arm roller
46 centre of gravity of self-hoisting crane
47 hook
48 centre of gravity of container excluding the self-hoisting crane
49 container
50 lifting eye
51, 52 exit sheave
53 pivot axis of sheave housing
54 cable of auxiliary crane
55 cable guide of sheave housing
56, 57 plate of cable guide
58, 59 guide roller of cable guide
60 tubular spindle of sheave housing
61 sheave bracket
62 floor of container
63, 64 guide rail of guide system
65 ballast system
66 guide roller of boom arm
67 ballast sheave
68 auxiliary ballast sheave
69 ballast weight
70 ballast cable
71 first end of ballast cable
72 second end of ballast cable
73 roller for ballast cable
74 ballast sheave bracket
75 ballast cable roller of ballast sheave bracket
76 spooling system
77 first spooling sheave 78 second spooling sheave
79 common motor drive of spooling system
80 chain drive of spooling system
81 end sheave
82 auxiliary sheave
83 first slide
84 second slide
85 first chain part of chain drive
86 second chain part of chain drive
87 first auxiliary gear wheel
88 second auxiliary gear wheel
89 gear wheel

The invention claimed is:

1. A self-hoisting crane system including a self-hoisting crane and a container for transporting, lifting and lowering the self-hoisting crane to and from a wind turbine, wherein the container has a longitudinal direction extending from a first to a second end of the container, wherein the container includes a cable winch arranged in the first end of the container, wherein the self-hoisting crane is adapted to be hoisted from the container to a nacelle of the wind turbine by operating the cable winch in the container, wherein at least one cable is adapted to extend from the cable winch in the container, around an exit sheave arranged in the container, and exit the container from the exit sheave in an upward direction in order to pass around at least one roller arranged at a crane base arranged on the nacelle and continue in a downward direction to the self-hoisting crane, enter through a central opening in a pedestal of the self-hoisting crane and continue to a hook block of the self-hoisting crane, wherein the container includes a guide system adapted to guide the self-hoisting crane during part of the lifting and lowering of the self-hoisting crane from and to the container, and wherein the container including the cable winch, the guide system, the exit sheave and any auxiliary hoisting equipment located in the container, has a centre of gravity located at a longitudinal position between the first and second ends on the container, wherein the exit sheave is located at a longitudinal position of the container deviating not more than 10 percent of the length of the container from the longitudinal position of the centre of gravity of the container.

2. A self-hoisting crane system according to claim 1, wherein the self-hoisting crane is mountable on the nacelle and includes an arm base and a boom arm, wherein the hook block is arranged at a tip end of the boom arm, wherein the at least one cable is adapted to lift or lower the hook block for operation of the self-hoisting crane in a mounted position on the nacelle, and wherein the pedestal is adapted to be mounted on the crane base.

3. A self-hoisting crane system according to claim 2, wherein the arm base is provided with at least one base roller, wherein the tip end of the boom arm is provided with at least one boom arm roller, and wherein the self-hoisting crane is adapted to be lifted from the container with the pedestal pointing upwards until the pedestal reaches the crane base in that the at least one base roller and the at least one boom arm roller roll on the at least one cable.

4. A self-hoisting crane system according to claim 3, wherein the arm base is arranged rotatably about an arm base axis on the pedestal, the arm base axis being vertical in the operational position of the self-hoisting crane, wherein the boom arm is arranged pivotally about a boom arm axis on the arm base, the boom arm axis being horizontal in the operational position of the self-hoisting crane, wherein a linear boom actuator is arranged between the arm base and the boom arm and is displaceable between a retracted position in which the boom arm is lowered in the operational position of the self-hoisting crane and an extended position in which the boom arm is lifted in the operational position of the self-hoisting crane, wherein, in the extended position of the linear boom actuator, a centre of gravity of the self-hoisting crane is below a straight line between the respective axes of the at least one base roller and of the at least one boom arm roller when the at least one base roller and the at least one boom arm roller roll on the at least one cable and the linear boom actuator is positioned under the boom arm during hoisting of the self-hoisting crane to the nacelle of the wind turbine.

5. A self-hoisting crane system according to claim 3, wherein the exit sheave is arranged rotationally in a sheave housing about an axis of rotation being at least substantially at right angles to the longitudinal direction of the container, and wherein the sheave housing is arranged pivotally in relation to the container about a pivot axis extending at least substantially in the longitudinal direction of the container.

6. A self-hoisting crane system according to claim 3, wherein the container is provided with at least one guide rail, wherein the tip end of the boom arm of the self-hoisting crane is provided with a guide roller adapted to roll on the at least one guide rail, and wherein the guide rail is inclined in upward direction in relation to a floor of the container in the longitudinal direction of the container.

7. A self-hoisting crane system according to claim 2, wherein the container is provided with at least one guide rail, wherein the tip end of the boom arm of the self-hoisting crane is provided with a guide roller adapted to roll on the at least one guide rail, and wherein the guide rail is inclined in upward direction in relation to a floor of the container in the longitudinal direction of the container.

8. A self-hoisting crane system according to claim 2, wherein the exit sheave is arranged rotationally in a sheave housing about an axis of rotation being at least substantially at right angles to the longitudinal direction of the container, and wherein the sheave housing is arranged pivotally in relation to the container about a pivot axis extending at least substantially in the longitudinal direction of the container.

9. A self-hoisting crane system according to claim 1, wherein the exit sheave is arranged rotationally in a sheave housing about an axis of rotation being at least substantially at right angles to the longitudinal direction of the container, and wherein the sheave housing is arranged pivotally in relation to the container about a pivot axis extending at least substantially in the longitudinal direction of the container.

10. A self-hoisting crane system according to claim 9, wherein the sheave housing is provided with a cable guide being arranged rotationally in the sheave housing about the axis of rotation of the exit sheave.

11. A self-hoisting crane system according to claim 10, wherein the cable guide has the form of a first and a second plate arranged on respective sides of the exit sheave, wherein the first and second plates are connected by means of a first and a second guide roller having respective axes of rotation being parallel to the axis of rotation of the exit sheave, and wherein the cable exits from the exit sheave in the direction of the self-hoisting crane between the first and second guide rollers.

12. A self-hoisting crane system according to claim 11, wherein the sheave housing is arranged pivotally about the pivot axis in that a tubular spindle of the sheave housing is arranged pivotally in a sheave bracket mounted on a floor of the container, and wherein the cable extends from the cable winch to the exit sheave through the tubular spindle.

13. A self-hoisting crane system according to claim 10, wherein the sheave housing is arranged pivotally about the pivot axis in that a tubular spindle of the sheave housing is arranged pivotally in a sheave bracket mounted on a floor of the container, and wherein the cable extends from the cable winch to the exit sheave through the tubular spindle.

14. A self-hoisting crane system according to claim 9, wherein the sheave housing is arranged pivotally about the pivot axis in that a tubular spindle of the sheave housing is arranged pivotally in a sheave bracket mounted on a floor of the container, and wherein the cable extends from the cable winch to the exit sheave through the tubular spindle.

15. A self-hoisting crane system according to claim 1, wherein the container is provided with a ballast system including a ballast sheave being arranged displaceably in a transverse direction of the container, wherein the cable extends from the cable winch about the ballast sheave and to the crane, wherein a ballast weight is hanging in a first end of a ballast cable and the ballast sheave is adapted to be pulled by the ballast cable, and wherein the ballast cable extends over at least one roller attached to the container.

16. A self-hoisting crane system according to claim 1, wherein the self-hoisting crane is provided with a first and a second cable, wherein the cable winch includes a first and a second mirrored cable winches for the respective first and second cables, wherein the first and second cable winches are rotatably arranged about a common axis of rotation extending in a transverse direction of the container, wherein the container is provided with a spooling system including a first spooling sheave guiding the first cable during spooling on the first winch and a second spooling sheave guiding the second cable during spooling on the second winch, wherein the first and second spooling sheaves are arranged displaceably in the transverse direction of the container, and wherein a common motor drive is arranged to displace the first and second spooling sheaves in opposite directions by means of a common transmission.

17. A method of hoisting a self-hoisting crane of a self-hoisting crane system, whereby the self-hoisting crane is transported to and from a wind turbine in a container, whereby the container has a longitudinal direction extending from a first to a second end of the container, whereby the self-hoisting crane is lifted and lowered between the container and a nacelle of the wind turbine by operating a cable winch arranged at the first end of the container, whereby at least one cable extends from the cable winch in the container, around an exit sheave arranged in the container, exits the container from the exit sheave in an upward direction and subsequently passes around at least one roller arranged at a crane base arranged on the nacelle and continues in a downward direction to the self-hoisting crane, enters through a central opening in a pedestal of the self-hoisting crane and continues to a hook block of the self-hoisting crane, and whereby a guide system of the container guides the self-hoisting crane during part of the lifting and lowering of the self-hoisting crane from and to the container, wherein the at least one cable exits the container from the exit sheave so that, during lifting and lowering of the self-hoisting crane from and to the container, a tip end of a boom arm of the self-hoisting crane leaves and enters the container at an intermediate position between the first and the second end of the container.

18. A method of hoisting a self-hoisting crane according to claim 17, wherein an arm base of the self-hoisting crane is provided with at least one base roller, wherein the tip end of the boom arm of the self-hoisting crane is provided with at least one boom arm roller, and whereby the self-hoisting crane is lifted from the container with the pedestal pointing upwards until the pedestal reaches the crane base in that the at least one base roller and the at least one boom arm roller roll on the at least one cable.

19. A method of hoisting a self-hoisting crane according to claim 17, whereby the container including cable winch, guide system, exit sheave and any auxiliary hoisting equipment located in the container, but excluding the self-hoisting crane, has a centre of gravity located at a longitudinal position between the first and second ends on the container, and whereby the at least one cable exits the container from the exit sheave at a longitudinal position of the container deviating not more than 10 percent of the length of the container from the longitudinal position of the centre of gravity of the container.

20. A method of hoisting a self-hoisting crane according to claim 17, whereby, during part of the lifting and lowering of the self-hoisting crane from and to the container, at least one guide roller at the tip end of the boom arm of the self-hoisting crane rolls on a guide rail of the container, and whereby the guide rail is inclined in upward direction in relation to a floor of the container in the longitudinal direction of the container.

* * * * *